(12) United States Patent
Takahashi

(10) Patent No.: US 7,522,197 B2
(45) Date of Patent: Apr. 21, 2009

(54) RECORDING MEDIUM FOR DATA FILE MANAGEMENT, APPARATUS FOR DATA FILE MANAGEMENT, HANDLING APPARATUS FOR IMAGE DATA, AND IMAGE CAPTURING SYSTEM

(75) Inventor: Isao Takahashi, Koshigaya (JP)

(73) Assignee: Nikon Corporation, Tokyo (JP)

( * ) Notice: Subject to any disclaimer, the term of this patent is extended or adjusted under 35 U.S.C. 154(b) by 472 days.

(21) Appl. No.: 11/474,308

(22) Filed: Jun. 26, 2006

(65) Prior Publication Data

US 2006/0238619 A1    Oct. 26, 2006

Related U.S. Application Data

(63) Continuation of application No. 09/840,914, filed on Apr. 25, 2001, now abandoned.

(30) Foreign Application Priority Data

| Apr. 26, 2000 | (JP) | ............................... 2000-126138 |
| May 2, 2000 | (JP) | ............................... 2000-133735 |
| May 16, 2000 | (JP) | ............................... 2000-143623 |
| May 16, 2000 | (JP) | ............................... 2000-143624 |

(51) Int. Cl.
*H04N 5/76*    (2006.01)

(52) U.S. Cl. ................................ 348/231.99; 348/231.2
(58) Field of Classification Search ............ 348/231.99, 348/231.2
See application file for complete search history.

(56) References Cited

U.S. PATENT DOCUMENTS

| 5,946,697 | A  | 8/1999 | Shen |
| 6,058,428 | A  | 5/2000 | Wang et al. |
| 6,373,507 | B1 | 4/2002 | Camara et al. |
| 6,374,266 | B1 | 4/2002 | Shnelvar |
| 6,657,654 | B2 | 12/2003 | Narayanaswami |

*Primary Examiner*—James M Hannett
(74) *Attorney, Agent, or Firm*—Oliff & Berridge, PLC

(57) ABSTRACT

When a shutter release operation is performed at an electronic still camera, an MPU records image data output from an image capturing element into a CF card. The MPU also stores the image data in a transfer buffer memory of an interface circuit. The image data stored in the transfer buffer memory are transferred to a transfer buffer memory provided at an interface circuit of a personal computer connected via an IEEE-1394 cable. The MPU of the personal computer reads out the image data having been taken into the personal computer from the transfer buffer memory and records them in a specific recording area in a recording device.

6 Claims, 23 Drawing Sheets

131 (NUMERICAL VALUE PORTION)   132 (NAME PORTION)

140 (FILE NAME)

141 (HEADER PORTION)  142 (NUMERICAL VALUE PORTION)  143 (EXTENSION)

```
D S C N 0 0 0 1 . J P G
D S C N 0 0 0 2 . J P G
D S C N 0 0 0 3 . J P G
        ⋮
D S C N 9 9 9 9 . J P G
I N F O . T X T
```

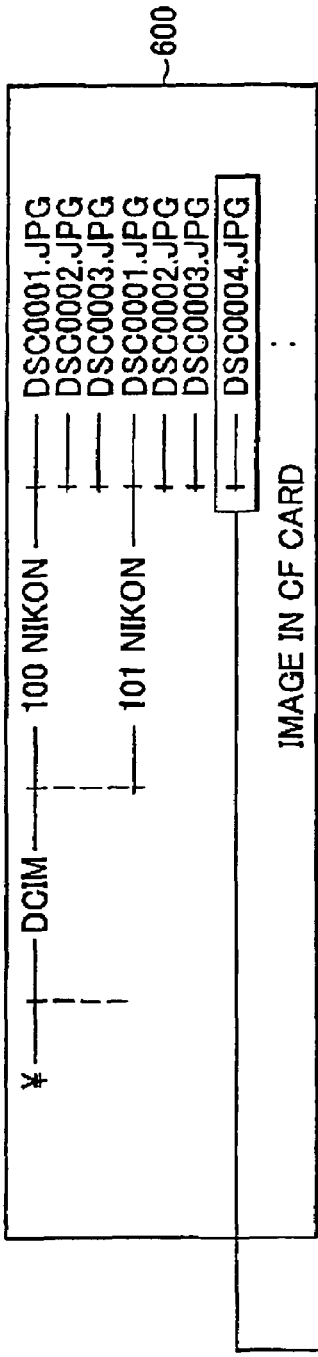
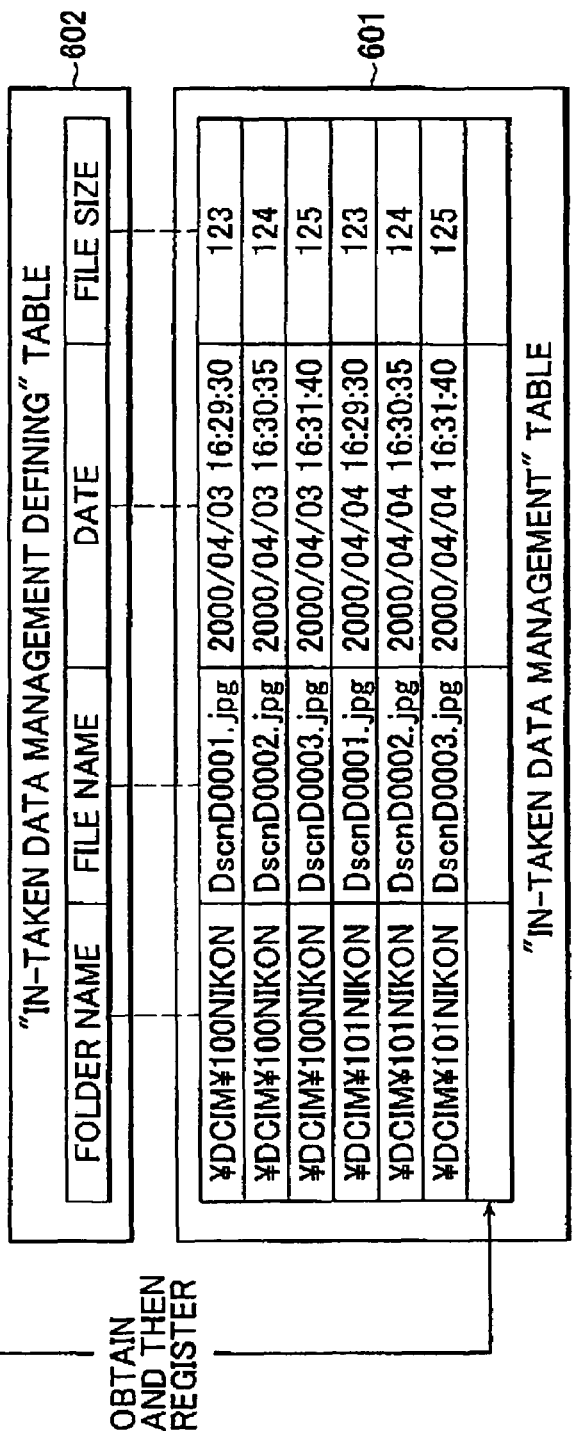

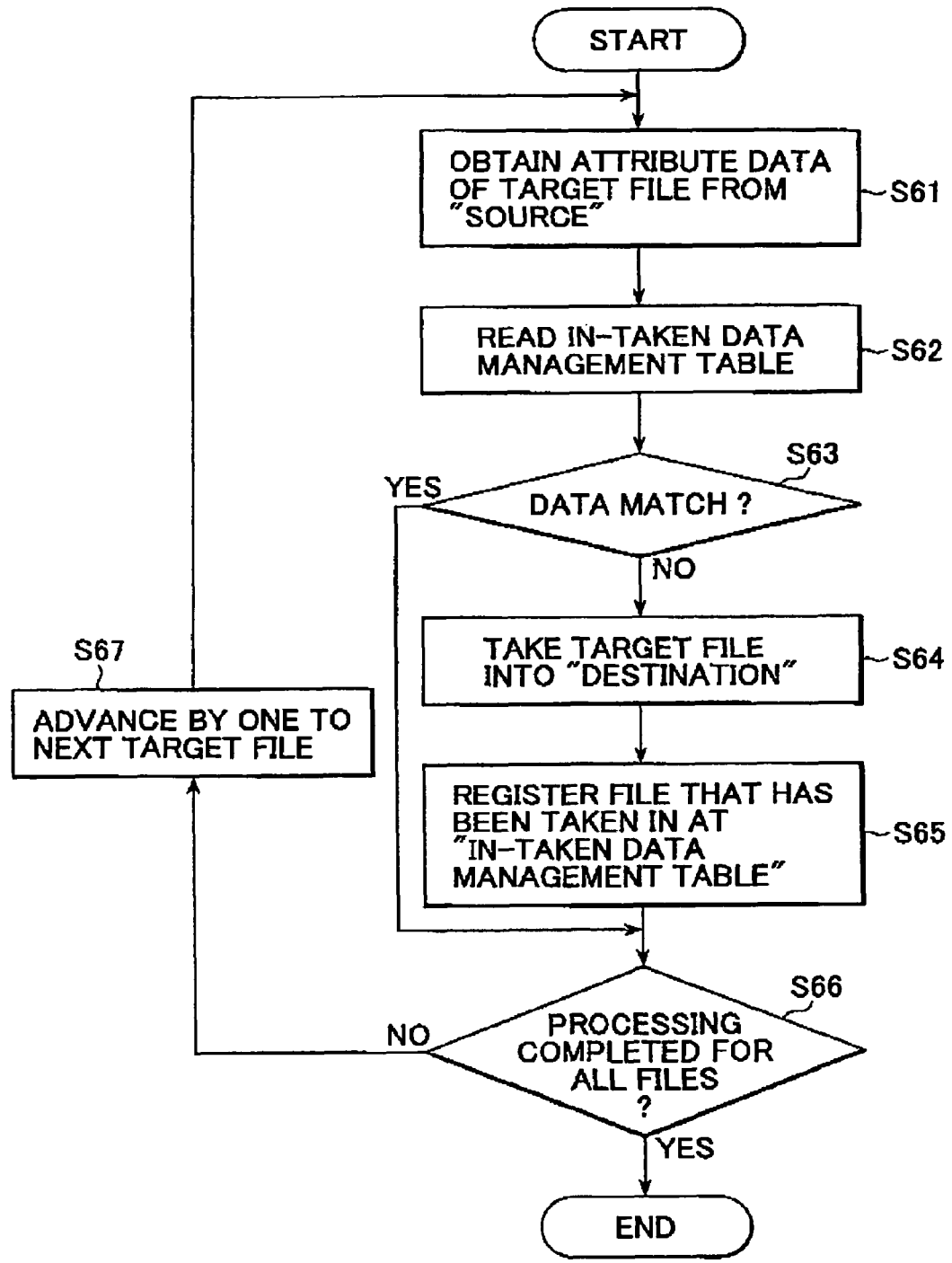

FIG.11

| 140 | | |
|---|---|---|
| 141　142 | 150 | 160 |
| DSCN0004.JPG | 2000/02/25 | 14:05:00 |
| DSCN0005.JPG | 2000/02/25 | 14:05:00 |
| DSCN0006.JPG | 2000/02/25 | 14:05:01 |
| DSCN0007.JPG | 2000/02/25 | 14:05:01 |

| READ ONLY |
|---|
| 2000/04/04    16:30:** |
| |
| |
| |
| |

RECORDING MEDIUM FOR DATA FILE MANAGEMENT, APPARATUS FOR DATA FILE MANAGEMENT, HANDLING APPARATUS FOR IMAGE DATA, AND IMAGE CAPTURING SYSTEM

This is a Continuation of application Ser. No. 09/840,914 filed Apr. 25, 2001. The disclosure of the prior application is hereby incorporated by reference herein in its entirety.

INCORPORATION BY REFERENCE

The disclosures of the following priority applications are herein incorporated by reference:
Japanese Patent Application No. 2000-126138 filed Apr. 26, 2000
Japanese Patent Application No. 2000-133735 filed May 2, 2000
Japanese Patent Application No. 2000-143623 filed May 16, 2000
Japanese Patent Application No. 2000-143624 filed May 16, 2000

BACKGROUND OF THE INVENTION

1. Field of the Invention

The present invention relates to a recording medium having stored therein a data file management program, an apparatus for data file management, a handling apparatus for image data and an image capturing system.

2. Description of the Related Art

Image data recorded in a recording medium such as a CF (compact flash) card in an electronic camera, for instance, are transmitted to a personal computer or the like where a specific application program is executed and are written into a data recording device at the personal computer. Then, by executing the specific application program on the personal computer, the image data having been written in the data recording device are read out. The image data thus read out are displayed on a display device which may be a display unit connected to the personal computer or printed out on an output device connected to the personal computer.

SUMMARY OF THE INVENTION

An object of the present invention is to provide a recording medium for data file management that is utilized to record image data obtained by capturing images in an electronic camera into a data recording device, an apparatus for data file management, a handling apparatus for image data and an image capturing system.

In order to achieve the object described above, a recording medium according to the present invention has a data file management program recorded therein, and the program comprises: recording processing in which an information data file is recorded in a recording medium; attribute data file creation processing in which an attribute data file having recorded therein attribute information of the information data file recorded in the recording medium is created; read processing in which attribute information of an information data file that has not yet been recorded in the recording medium is read; decision-making processing in which a decision is made as to whether or not the attribute information recorded in the attribute data file matches the attribute information read through the read processing, a match signal is output when matching and a non-match signal is output when not-matching; and control processing in which control is implemented on the recording processing based upon results of the decision made in the decision-making processing.

In the control processing, a recording operation through the recording processing may be allowed when the non-match signal is output through the decision-making processing and a recording operation through the recording processing may be disallowed when the match signal is output through the decision-making processing.

In the attribute data file creation processing, the attribute information of the information data file having been recorded through the recording processing may be recorded in the attribute data file when the recording operation is allowed through the control processing.

The attribute data file may be held over a predetermined length of time.

The program recorded in the above recording medium may further comprise: specification processing in which at least one type of attribute information in the attribute information is specified; and decision-making processing in which a decision is made as to whether or not the attribute information specified through the specification processing matches the attribute information read through the read processing, a match signal is output when matching and a non-match signal is output when not-matching, and in the control processing, the recording processing may be controlled so as to allow a recording operation through the recording processing when the match signal is output through the decision-making processing and disallow a recording operation through the recording processing when the non-match signal is output through the decision-making processing.

A recording medium according to the present invention has a data file management program recorded therein, and the program comprises: recording processing in which an information data file is recorded in a recording medium; read processing in which attribute information of at least two information data files that have not yet been recorded in the recording medium is read; decision-making processing in which a decision is made as to whether or not there is specific continuity in the information data files based upon the attribute information read through the read processing; and file management processing in which the information data files are managed to be grouped based upon results of the decision made through the decision-making processing.

In the decision-making processing, a decision may be made as to whether or not specific continuity manifests with regard to time points at which the information data files were created; and in the file management processing, the information data files may be managed as information data files in a single group when the continuity is determined to manifest through the decision-making processing.

The information data file that has not yet been recorded in the recording medium may be already recorded in an electronic camera or in a computer apparatus.

A data file management apparatus according to the present invention comprises: a recording device that records an information data file in a recording medium; an attribute data file creation device that creates an attribute data file having recorded therein attribute information of the information data file recorded in the recording medium; a read device that reads attribute information of an information data file which has not yet been recorded in the recording medium; a decision-making circuit that makes a decision as to whether or not the attribute information recorded in the attribute data file matches the attribute information read by the read device, outputs a match signal when matching and outputs a non-match signal when not-matching; and a control circuit that controls the recording device based upon results of the decision made by the decision-making circuit.

A data file management apparatus according to the present invention comprises: a recording device that records an information data file in a recording medium; a read device that reads attribute information of at least two information data files which have not yet been recorded in the recording medium; a decision-making circuit that makes a decision as to whether or not specific continuity manifests in the information data files based upon the attribute information read by the read device; and a file management circuit that implements grouping management on the information data files based upon results of the decision made by the decision-making circuit.

A method according to the present invention for transmitting image data from an electronic camera to a computer apparatus, comprises: preparing attribute information of the image data, by the electronic camera; receiving the attribute information of the image data, comparing the attribute information thus received with attribute information recorded in an attribute data file in a recording device of the computer apparatus, and issuing a request for the image data to the electronic camera only when the attribute information of the image data does not completely match the attribute information recorded in the attribute data file, by the computer apparatus; preparing the image data upon receiving the request for the image data, by the electronic camera; and receiving the image data to record in the recording device and updating the attribute data file by recording the attribute information of the image data after image data have been recorded, by the computer apparatus.

A method according to the present invention for transmitting data from a first electronic apparatus having data to a second electronic apparatus that records data in a recording medium, comprises: receiving attribute information of the data from the first electronic apparatus, and comparing the attribute information with attribute information recorded in an attribute data file in the recording medium, by the second electronic apparatus; receiving the data from the first electronic apparatus and recording the data in the recording medium only when the attribute information of the data does not completely match the attribute information recorded in the attribute data file, by the second electronic apparatus; and updating the attribute data file by recording the attribute information of the data after the data have been recorded, by the second electronic apparatus.

A recording medium according to the present invention has a data file management program recorded therein, and the program comprises: recording processing in which an information data file is recorded in a recording medium; identification file recording processing in which an identification data file containing information provided related to the information data file recorded through the recording processing is created and recorded in the recording medium; identification file read processing in which the identification data file is read from the recording medium; identification processing in which the information data file is identified by using the identification data file read through the specification file read processing; and identification file delete processing in which the identification data file recorded in the recording medium is deleted.

The identification file recording processing may be implemented immediately after the recording processing is completed and the identification file delete processing may be implemented immediately after the identification processing is completed.

A recording medium according to the present invention has a data file management program recorded therein, and the program comprises: identification file recording processing in which an identification data file containing information provided related to an information data file to be deleted from the recording medium is created and recorded in the recording medium; delete processing in which the information data file is deleted from the recording medium; identification file read processing in which the identification data file is read from the recording medium; identification processing in which the information data file is identified by using the identification data file read through the identification file read processing; and identification file delete processing in which the identification data file recorded in the recording medium is deleted.

The identification file recording processing may be implemented before the delete processing starts and the identification file delete processing may be implemented immediately after the identification processing is completed.

A data file management apparatus according to the present invention comprises: a recording device that records an information data file in a recording medium; an identification file recording device that creates an identification data file containing information provided related to the information data file recorded by the recording device and records the identification data file in the recording medium; an identification file read device that reads the identification data file from the recording medium; an identification circuit that identifies the information data file by using the identification data file read by the identification file read device; and an identification file delete device that deletes the identification data file recorded in the recording medium.

A data file management apparatus according to the present invention comprises: an identification file recording device that creates an identification data file containing information provided related to an information data file to be deleted from a recording medium and records the identification data file in the recording medium; a delete device that deletes the information data file from the recording medium; an identification file read device that reads the identification data file from the recording medium; an identification circuit that identifies the information data file by using the identification data file read by the identification file read device; and an identification file delete device that deletes the identification data file recorded in the recording medium.

An image capturing system according to the present invention comprises: an image capturing device that captures an image of a subject and outputs the captured image as image data; a first recording device that records the image data in a first recording medium; a second recording device that records the image data in a second recording medium other than the first recording medium; a first control circuit that controls the first recording device so as to allow the first recording device to perform a recording operation with timing with which an image capturing operation is performed by the image capturing device; and a second control circuit that controls the second recording device so as to allow the second recording device to perform a recording operation with timing with which an image capturing operation is performed by the image capturing device.

The above image capturing system may further comprise: a decision-making circuit that makes a decision as to whether or not the second recording device is capable of performing a recording operation, and the second control circuit may halt the recording operation by the second recording device after a negative decision is made by the decision-making circuit.

The second control circuit may start the recording operation by the second recording device when an affirmative decision is made by the decision-making circuit while the recording operation by the second recording device is suspended.

The above image capturing system may further comprise: a read device that reads image data recorded in the first recording medium while the recording operation by the second recording device is suspended, and the second control circuit may control the second recording device so that the image data read by the read device are recorded in the second recording medium only after an affirmative decision is made by the decision-making circuit.

The above image capturing system may further comprise: a decision-making circuit that makes a decision as to whether or not the first recording device is capable of performing a recording operation, and the first control circuit may halt the recording operation by the first recording device after a negative decision is made by the decision-making circuit.

The first control circuit may start the recording operation by the first recording device when an affirmative decision is made by the decision-making circuit while the recording operation by the first recording device is suspended.

The above image capturing system may further comprise: a read device that reads image data recorded in the second recording medium while the recording operation by the first recording device is suspended, and the first control circuit may control the first recording device so that the image data read by the read device are recorded in the first recording medium only after an affirmative decision is made by the decision-making circuit.

An image capturing system according to the present invention comprises: an image capturing device that captures an image of a subject and outputs the captured image as image data; a first recording device that records the image data in a first recording medium; a second recording device that records the image data in a second recording medium other than the first recording medium; a control circuit that stops a recording operation performed by the second recording device and records the image data into the first recording medium by engaging the first recording device with timing with which an image capturing operation is performed by the image capturing device; and a decision-making circuit that makes a decision as to whether or not the first recording device is capable of performing a recording operation, wherein the control circuit halts the recording operation by the first recording device and starts the recording operation by the second recording device with the timing with which an image capturing operation is performed by the image capturing device after a negative decision is made by the decision-making circuit.

While the recording operation by the first record device is suspended, the control circuit may start the recording operation by the first recording device and halt the recording operation by the second recording device after an affirmative decision is made by the decision-making circuit.

The above image capturing system may further comprise: a read device that reads image data recorded in the first recording medium while the recording operation by the second recording device is suspended, and the control circuit may control the first recording device so that the image data read by the read device are recorded in the first recording medium only after an affirmative decision is made by the decision-making circuit.

An image capturing system according to the present invention comprises: an image capturing device that captures an image of a subject and outputs the captured image as image data; a first recording device that records the image data in a first recording medium; a second recording device that records the image data in a second recording medium other than the first recording medium; a control circuit that stops a recording operation performed by the first recording device and records the image data into the second recording medium by engaging the second recording device with timing with which an image capturing operation is performed by the image capturing device; and a decision-making circuit that makes a decision as to whether or not the second recording device is capable of performing a recording operation, wherein the control circuit halts the recording operation by the second recording device and starts the recording operation by the first recording device with the timing with which an image capturing operation is performed by the image capturing device after a negative decision is made by the decision-making circuit.

While the recording operation by the second recording device is suspended, the control circuit may start the recording operation by the second recording device and halt the recording operation by the first recording device after an affirmative decision is made by the decision-making circuit.

The above image capturing system may further comprise: a read device that reads image data recorded in the first recording medium while the recording operation by the second recording device is suspended, and the control circuit may control the second recording device so that the image data read by the read device are recorded in the second recording medium only after an affirmative decision is made by the decision-making circuit.

The image capturing device may be provided at a camera; and the first recording medium may be detachably loaded in the camera.

The second recording medium may be provided at a computer apparatus that engages in transfer of image data with the camera.

An image data handling apparatus according to the present invention, comprises: a first data input circuit to which image data are input from an external apparatus internally provided with a first recording medium; a second data input circuit to which image data are input from a second recording medium other than the first recording medium; and a control circuit that controls the first data input circuit and the second data input circuit so as to give the image data input through the second data input circuit priority for reception when image data are input through the first data input circuit and through the second data input circuit.

The external apparatus having the first recording medium may be a camera; and the second recording medium may be a recording medium that can be loaded in the camera.

The image data may be still image data, and the above image data handling apparatus may further comprise: a first detection circuit that detects whether or not image data have been input through the first data input circuit; and a second detection circuit that detects whether or not image data have been input through the second data input circuit, and the control circuit may control the first data input circuit and the second data input circuit so that: (1) when an input is detected by the first detection circuit ahead of the second detection circuit, a detection is made by the second detection circuit as to whether or not image data have been input immediately after image data corresponding to one frame have been received from the first data input circuit, and then if an input is detected by the second detection circuit, image data for all frames are received from the second data input circuit; and (2) when an input is detected by the second detection circuit ahead of the first detection circuit, the image data for all the frames are received from the second data input circuit.

An image data handling apparatus according to the present invention comprises: a first data input circuit to which still image data are input from an external apparatus internally provided with a first recording medium; a second data input circuit to which still image data are input from a second recording medium other than the first recording medium; a first detection circuit that detects whether or not still image data have been input through the first data input circuit; a second detection circuit that detects whether not still image data have been input through the second data input circuit; and a control circuit that controls the first detection circuit and the second detection circuit to engage the second detection circuit to detect whether or not an input has been made each time an input of still image data for one frame is completed through the first data input circuit, and to engage the first detection circuit to detect whether or not an input has been made when an input of still image data for all frames recorded in the second recording medium is completed through the second data input circuit, in case that still image data are input through both the first data input circuit and the second data input circuit.

BRIEF DESCRIPTION OF THE DRAWINGS

FIG. 3 is provided to facilitate an explanation of the subdirectories;

FIG. 4 is provided to facilitate an explanation of the file names;

FIG. 5A shows image data files recorded in the CF card:

FIG. 5B shows the in-taken data management table recorded in the recording device of the personal computer;

FIG. 6 is a flowchart of the processing implemented to take an image data file into the recording device of the personal computer from the electronic still camera;

FIG. 11 presents attribute data indicating file names and dates;

FIG. 13 shows an intake specification defining table;

DESCRIPTION OF THE PREFERRED EMBODIMENTS

First Embodiment

Figure 1:
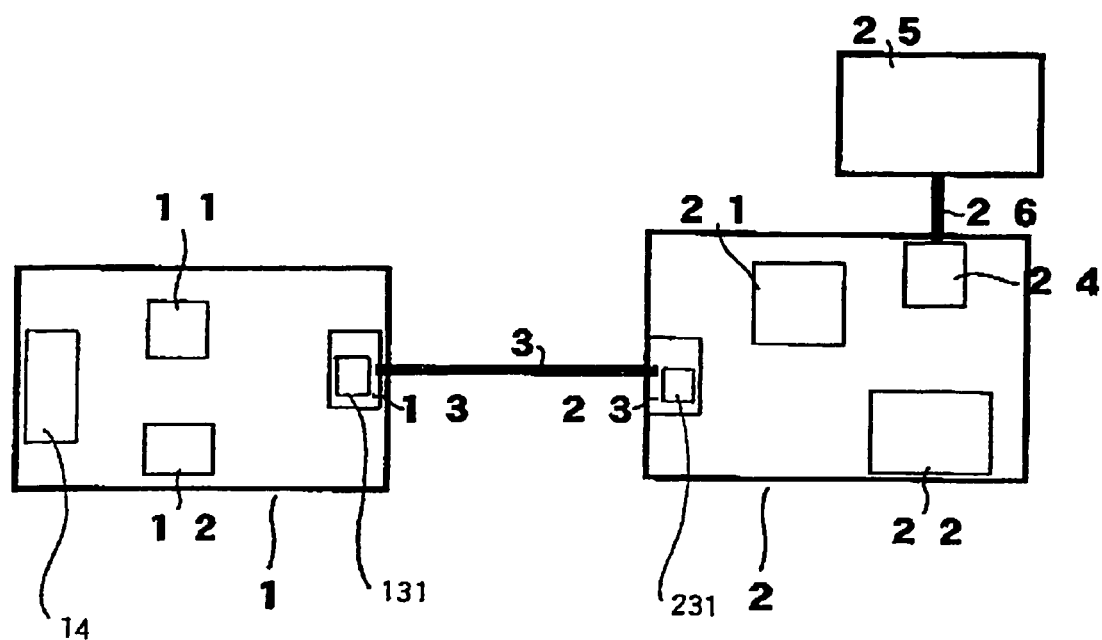
FIG. 1 schematically illustrates the display device employed to display an image data file in a first embodiment.

FIG. 1 schematically illustrates the display device employed to display image data files, which is provided with the data file management apparatus achieved in the first embodiment of the present invention. In FIG. 1, the image data file display device is achieved by connecting an electronic still camera 1 and a personal computer (PC) 2 through an IEEE-1394 cable 3. The electronic still camera 1 comprises an MPU 11, a CF card 12, an interface circuit 13 and an image capturing element 14. The electronic still camera 1 records image data obtained through an image capturing operation performed at the image capturing element 14 into the CF card 12 in a specific format. In addition, the electronic still camera 1 transfers the image data obtained through a photographing operation to the personal computer 2 via the interface circuit 13 and the IEEE-1394 cable 3. A transfer buffer memory 131 is provided at the interface circuit 13. The operation of the electronic still camera 1 is controlled by the MPU 11.

The personal computer 2 comprises an MPU 21, a recording device 22, an interface circuit 23, a display circuit 24 and a display device 25. The image data transferred from the electronic still camera 1 are taken into the personal computer 2 via the IEEE-1394 cable 3 and the interface circuit 23. The interface circuit 23 is provided with a transfer buffer memory 231. The image data taken into the personal computer 2 are recorded in a specific recording area in the recording device 22. The image data recorded in the recording device 22 are read out from the recording device 22 and converted to an image signal at the display circuit 24 and the resulting image signal is displayed at the display device 25 connected to the personal computer 2 via an image signal cable 26. The operation of the personal computer 2 is controlled by the MPU 21.

The image data having been taken into the personal computer 2 from the electronic still camera 1 are displayed at the display device 25 and, in addition, they are printed out at an output device (not shown) connected to the personal computer 2 or transmitted to another computer apparatus (not shown) which is capable of data exchange with the personal computer 2.

—Image Data File Names—

The recording areas in the recording device 22 are each made to correspond to the file name assigned to a given set of image data, and image data assigned with individual file names are recorded in the corresponding recording areas in the recording device 22.

Figure 2:
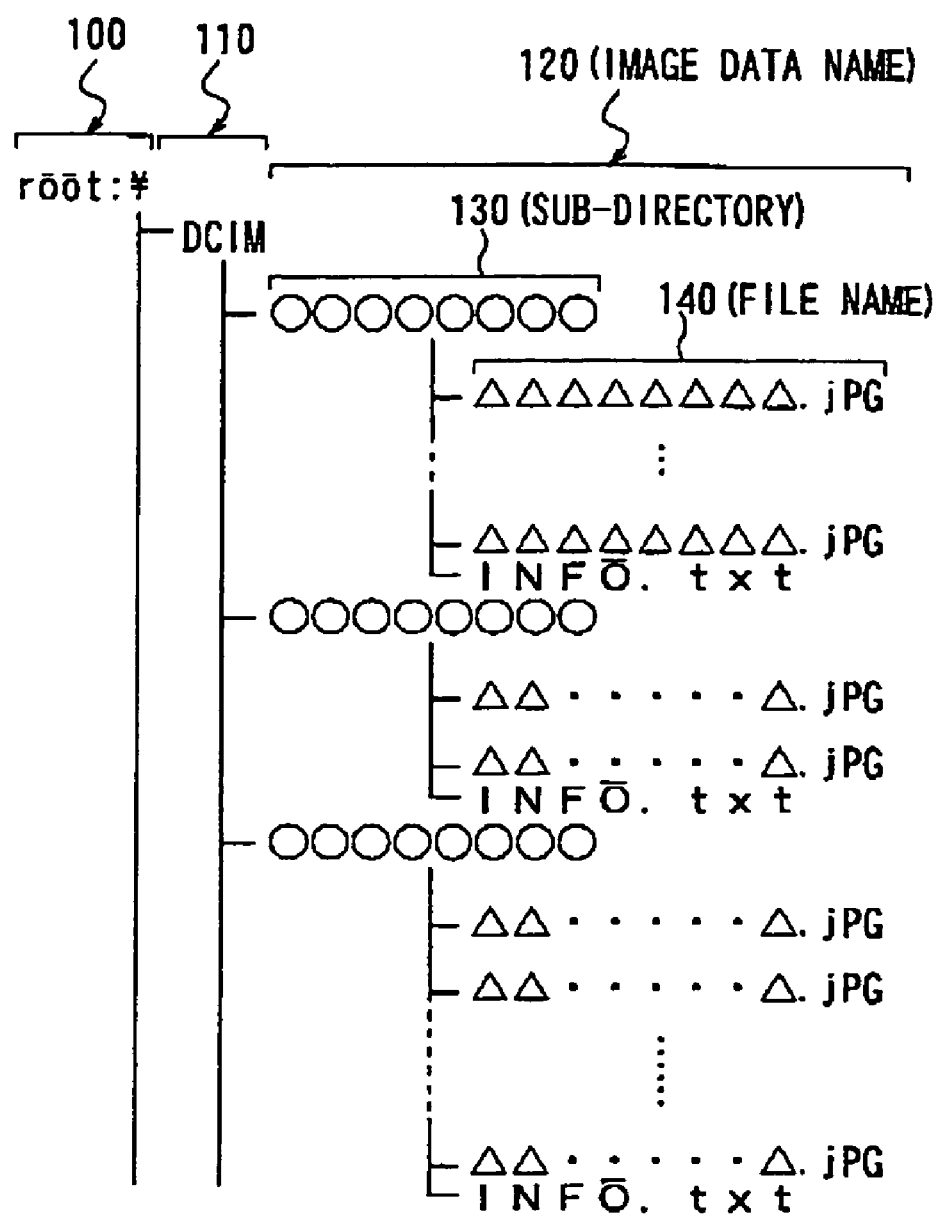
FIG. 2 shows the names assigned to the data provided when recording image data into a CF card in an electronic still camera.

The format in which the image data obtained by performing a photographing operation in the electronic still camera 1 and recorded in the CF card 12 is predetermined to match the format of the data managed in the personal computer so that the image data can be processed in the personal computer 2 and recorded images can be output to a display device or an output device (not shown). FIG. 2 is provided to facilitate an explanation of a data name assigned to image data obtained through a photographing operation performed in the electronic still camera 1 when they are recorded in the recording medium such as the CF card 12. In FIG. 2, a directory 110 "DCIM" is assigned under a root directory 100 in image data names in conformance to the DCF (Design Rules For Camera File Systems).

The so-called directory tree presented in FIG. 2 shows the structure of data files which are managed by, for instance, the personal computer 2. An explanation is given with regard to an image data name 120 provided under the directory 10. As shown in FIG. 2, the image data name 120 is constituted of a sub-directory 130 to which a plurality of names may be assigned and a file name 140 to which a plurality of names may be assigned provided under each sub-directory 130. This structure matches the DOS structure used in a system such as the personal computer 2 that handles the recording device. It is to be noted that in some personal computer basic programs (OS), directories are referred to as folders.

FIG. 3 is provided to facilitate an explanation of a sub-directory 130. The sub-directory 130 may be constituted of a numerical value portion 131 and a name portion 132. The numerical value portion 131 is constituted of a three-digit integer, whereas the name portion 132 is constituted of up to five alphanumeric characters or symbols. Different name portions 132 may be provided in the individual sub-directories 130, or a single name portion 130 may be used in different sub-directories 130. Even when the same name portion 132 is used, the sub-directories 130 can be distinguished from each other by assigning different integers in the numerical value portions 131 of the sub-directories 130.

FIG. 4 is provided to facilitate an explanation of a file name 140. The file name 140 may be constituted of, for instance, a header portion 141, a numerical value portion 142 and an extension 143. Four alphabetic characters are assigned in the header portion 141. "DSCN" in FIG. 4 indicates that the data assigned with a file name 140 are image data having been recorded in the electronic still camera 1. A four-digit integer is assigned in the numerical value portion 142. The extension 143, i.e., "JPG", indicates that the image data assigned with the file name 140 are image data having been compressed in the JPG format. As explained above, by assigning a name constituted of the sub-directory 130 and the file name 140 to a set of image data having been recorded in the electronic still camera 1, the image data are readied to undergo processing in the personal computer 2.

—Prevention of Duplicate File Intake—

Next, an in-taken data management table is explained. The in-taken data management table is a management table provided to record in the recording device 22 four management items together, i.e. the folder name, the filename, the date on which the image data were obtained through a photographing operation and the file size of the image data with regard to each of the image data files recorded in the recording device 22. This management table is used to ensure that when electronic image data are transmitted from the electronic still camera to the personal computer 2 connected as shown in FIG. 1, image data which have already been recorded in the recording device 22 are not transmitted again. FIG. 5A shows image data files 600 recorded in the CF card 12 and FIG. 5B illustrates the in-taken data management table 601.

In FIG. 5A, sets of image data obtained by performing a photographing operation in the electronic still camera 1 are recorded in the CF card 12 with individual file names attached thereto as explained earlier. Three files having file names 140, i.e., "DSCN0001.JPG"-"DSCN0003.JPG" are recorded in a folder with its sub-directory 130 assigned as "100NIKON". In addition, four files having file names 140, i.e., "DSCN0001.JPG"-"DSCN0004.JPG", are recorded in a folder with its sub-directory 130 assigned as "101NIKON". Let us now assume that the "DSCN0004.JPG" file in the "101NIKON" folder is to be provided to the personal computer 2 as a new file.

In FIG. 5B, the four management items explained above are recorded in correspondence to each file in the in-taken data management table 601. The management items managed by the in-taken data management table 601 are defined by an in-taken data management defining table 602. Namely, the data in the attribute data of each image data file recorded in the recording device 22, which correspond to the management items defined in the in-taken data management defining table 602, are prepared as table data and are recorded in the recording device 22 as the in-taken data management table 601. The attribute data include a plurality of types of information recorded in the CF card 12 as information indicating the intrinsic attributes of an image data file when image data are recorded as the image data file in the CF card 12 in the electronic still camera 1. They include photographing information such as the photographer's ID and the photographing conditions and a protector for preventing the file from being erased by mistake as well as the data corresponding to the four management items explained earlier.

The in-taken data management table 601 is updated each time a new image data file is recorded in the recording device 22. For instance, when the image data file with the file name "DSCN0004.JPG" in the folder having its sub-directory 130 assigned as "101NIKON" is recorded in the recording device 22, the data indicating the management items with regard to this image data file are added to the in-taken data management table 601.

The management items are selected as appropriate so as to enable identification of the individual data files from the plurality of types of attribute data mentioned above. Thus, simply by checking the management item data recorded in the in-taken data management table 601 that are part of the attribute data of an image data file, a decision can be made as to whether or not the corresponding image data should be recorded in the recording device 22 without having to check the entire contents of the image data file. In other words, a decision can be made simply by checking the management item data alone as to whether or not the image data file in question represents image data that have already been recorded in the recording device 22.

The processing implemented to take an image data file into the personal computer 2 in the image data file display apparatus described above is now explained in reference to the flowchart of the processing procedure in FIG. 6. In FIG. 6, the processing starts when the electronic still camera 1 and the personal computer 2 become connected with each other via the IEEE-1394 cable 3 after a specific image data file intake program is started up on the personal computer 2. In step S61, the MPU 21 of the personal computer 2 issues a request to the electronic still camera 1 to transmit the attribute data alone to the personal computer 2. In response to the request for the attribute data, the MPU 11 of the electronic still camera 1 transmits the attribute data of the target file in the CF card 12 to the personal computer 2. When step S61 is implemented for the first time after starting the processing in FIG. 6, only the attribute data of the first image data file in the CF card 12, i.e., the image data file assigned with the file name "DSCN0001.JPG", in the folder assigned with the folder name "100NIKON" are transmitted to the personal computer 2. In step S62, the MPU 21 of the personal computer 2 reads out data in the in-taken data management table 601 from the recording device 22 and then the operation proceeds to step S63.

In step S63, the MPU 21 makes a decision as to whether or not the data in the in-taken data management table 601 that have been read out from the recording device 22 match the attribute data of the target file taken in from the electronic still camera 1. If it is decided that they match (if an affirmative decision is made in step S63), the operation proceeds to step S66, and in this case, no request is issued to the electronic still camera 1 to send the image data file to the personal computer 2. If, on the other hand, it is decided that they do not match (if a negative decision is made in step S63), the operation proceeds to step S64. In step S64, the MPU 21 issues a request to the electronic still camera 1 to transmit the image data file, the attribute data of which were taken in step S61, to the personal computer 2. In response to the request for the image data file, the MPU 11 of the electronic still camera 1 provides the corresponding image data file in the CF card 12 to the personal computer 2. The MPU 21 of the personal computer 2 records the image data file thus taken in a specific recording area of the recording device 22 and then the operation proceeds to step S65.

In step S65, the MPU 21 records the management item data in the attribute data of the image data file recorded in the recording device 22 by adding the management item data to the in-taken data management table 601 at the recording device 22, and then the operation proceeds to step S66. In step S66, the MPU 11 makes a decision as to whether or not the processing has been completed for all the image data files recorded in the CF card 12. If it is decided that the processing has been completed (if an affirmative decision is made in step S66), an end flag is sent to the personal computer 2 and the processing in FIG. 6 ends. If, on the other hand, it is decided that the processing has not been completed (if a negative decision is made in step S66), the operation proceeds to step S67.

In step S67, the MPU 11 advances by one to the next target file, the attribute data of which are to be taken in from the CF card 12, before the operation returns to step S61.

—Identifying File Undergoing Intake/Delete Processing—

In the personal computer 2 in FIG. 1 explained above, an application program having an image file processing module and an image display processing module is executed. The image file processing module is a program module that receives an image data file recorded in the CF card 12 of the electronic still camera 1 at the personal computer 2 and records the image data file thus received in a specific area of the recording device 22 of the personal computer 2. The image display processing module is a program module that reads an image data file recorded in a specific area of the recording device 22 and displays a reproduced image corresponding to the image data on the display device 25 connected to the personal computer 2. These program modules engage in parallel processing when the application program is executed. Thus, the processing implemented by the image file processing module to record an image data file in a specific area of the recording device 22 and the processing implemented by the image display processing module to read an image data file from a specific area of the recording device 22 and display the image data file thus read out are executed asynchronously, and since a certain length of time must be allowed for the new file identification processing when a new image data file is added into the recording device 22, the image corresponding to the new image data file cannot be brought up on display at the display device 25 promptly.

The recording area of the recording device 22 is divided into a plurality of folders to facilitate the image data file management as explained earlier. The folders, which are also referred to as directories, indicate the locations at which the individual data files are recorded in the recording area of the recording device 22. Image data files are classified into groups each corresponding to a given photographer, for instance, and the image data files having been classified in this manner are recorded within folders assigned with the names of individual photographers. In the image data file display device in the first embodiment, folders in which image data files are recorded and a specific folder, which is different from the folders for recording the image data files, are provided in the recording device 22, and a management file is created inside the specific folder to manage the addition of an image data file into the recording device 22 or deletion of an image data file recorded in the recording device 22.

—Identifying Image Data File Being Taken In—

Figure 7:
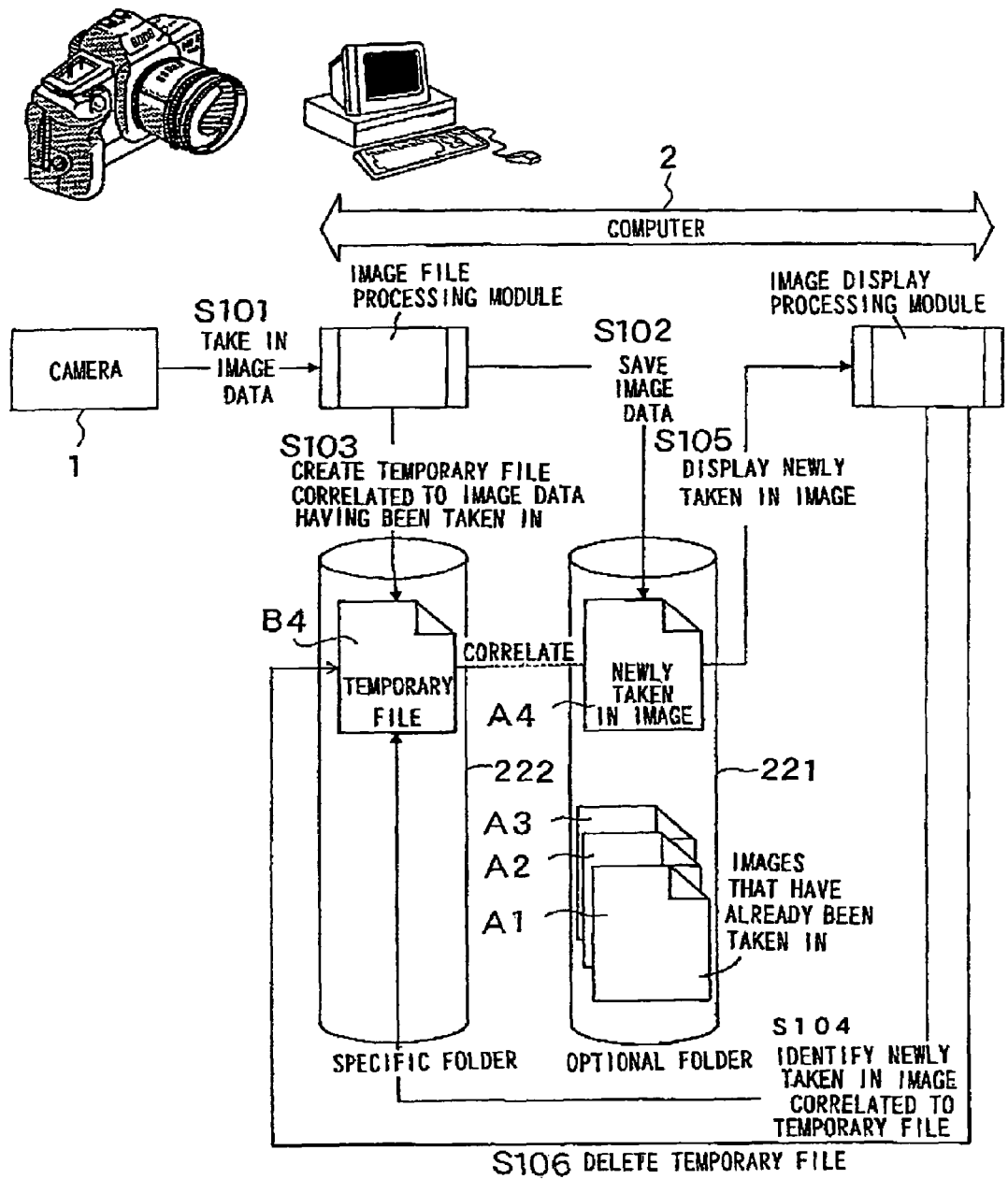
FIG. 7 illustrates the flow of the image data file intake processing implemented in the image data file display of apparatus in the first embodiment.

FIG. 7 illustrates the flow of the image intake processing. The processing is implemented as described below when adding an image data file into an optional folder 221. In FIG. 7, the optional folder 221 is provided to record image data files which have undergone the classification process. In order to facilitate the explanation, only one image data recording folder is shown in the figure. Image data files A1-A4 are recorded in the optional folder 221. The image data files A1-A3 have already been recorded in the folder 221, and the image data file A4 is a file that has been newly added into the folder 221.

A specific folder 222, on the other hand, is provided to enable creation of a management file. A management file B4 is recorded in the specific folder 222. In the management file B4, information that indicates specifically which image data file has been newly added into the optional folder 221 is recorded. In the example presented in FIG. 7, the file name of the image data file A4 is recorded in the management file B4. The management file B4 does not contain any image data, and the minimum volume of information that enables the identification of the image data file A4 is registered in the management file B4.

In FIG. 7, the processing from step S101-step S103 is implemented by the image file processing module in the application program. In step S101, the personal computer 2 receives the image data file from the electronic still camera 1. In step S102, the MPU 21 assigns a file name "A4" to the image data file that has been received and records the image data file in the folder 221. In step S103, the MPU 21 creates a management file having recorded therein the file name "A4" of the image data file A4 having been recorded in the folder 221 and records the management file in the specific folder 222 with a file name "B4" assigned to the management file.

The processing in steps S104-S106 is implemented by the image display processing module in the application program. In step S104, the MPU 21 checks to determine whether or not a file has been recorded in the specific folder 222. If a file has been recorded in the specific folder 222, the recorded management file (the management file B4 in the example in FIG. 7) is read and the file name of the image data file recorded in folder 221 is identified as "A4". In step S105, the MPU 21 reads the image data file A4 from the folder 221. In step S106, the MPU 21 deletes the management file B4 recorded in the specific folder 222 and ends the image data file addition processing. Afterwards, the MPU 21 displays an image corresponding to the image data file A4 thus read at the display device 25.

Figure 8:
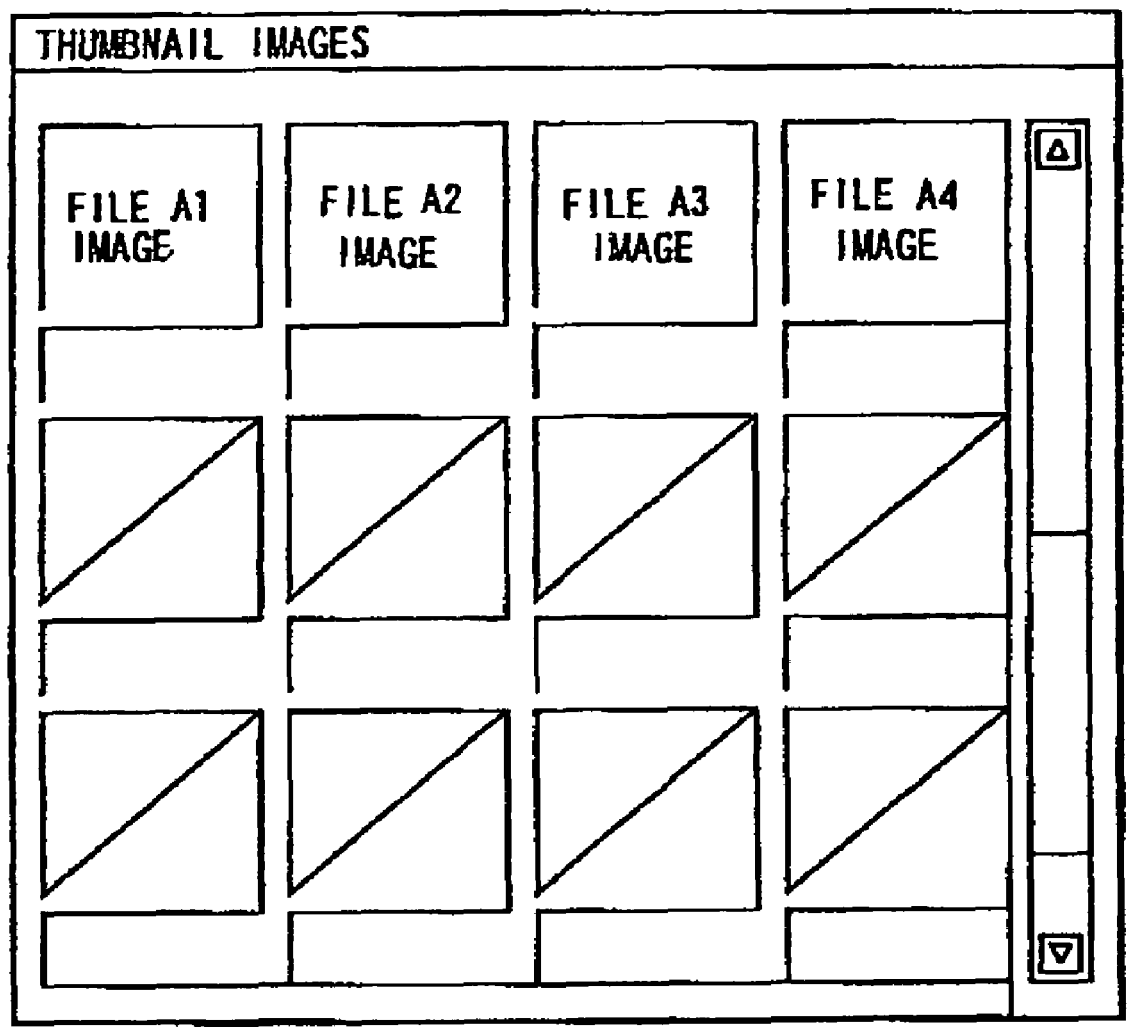
FIG. 8 presents an example of display at the display device in which images corresponding to image data files A1-A4 recorded in a optional folder are displayed.

If the application program is programmed to implement thumbnail display of all the images corresponding to the image data files recorded in the folder 221, thumbnail images are displayed at the display device 25 as illustrated in FIG. 8. FIG. 8 presents a display example in which images corresponding to the image data files A1-A4 recorded in the folder 221 are displayed at the display device 25. In FIG. 8, the diagonal lines each indicate that no image corresponding to specific image data is currently on display.

If, on the other hand, it is decided in step S104 that there is no file recorded in the specific folder 222, the MPU 21 sustains the image display by using the image data files A1-A3 that have been read previously. Namely, unless the management file B4 is recorded in the specific folder 222, the image data file A4 recorded in the folder 221 cannot be identified for a read. As a result, the images corresponding to the image data files A1-A3 that have already been read are continuously displayed at the display device 25.

—Identifying Image Data File Being Deleted—

Figure 9:
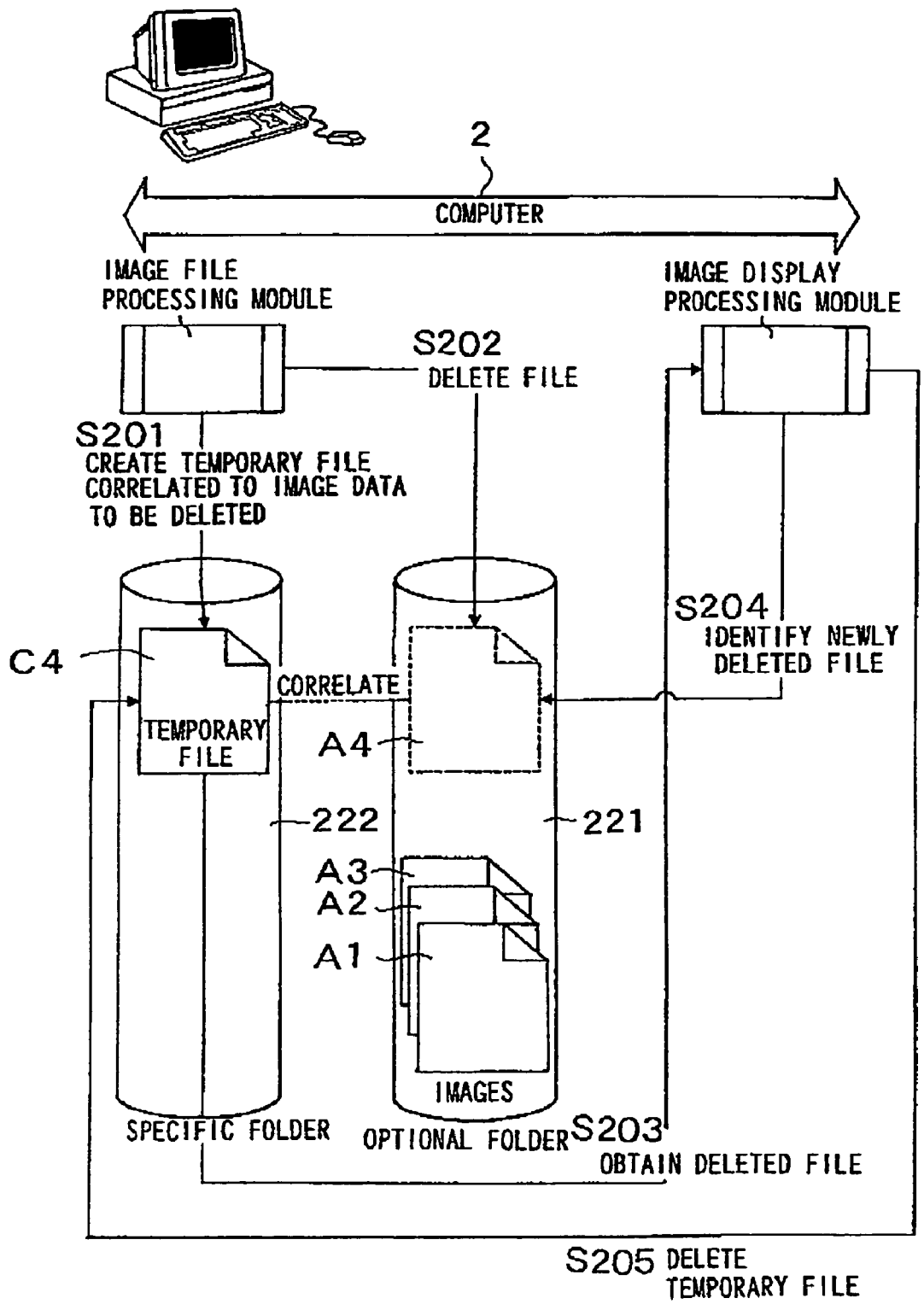
FIG. 9 illustrates the flow of the image delete processing.

The processing for deleting the image data file A4 recorded in the optional folder 221 is implemented as described below. FIG. 9 illustrates the flow of the image delete processing. In FIG. 9, image data files are recorded in the optional folder 221. As explained earlier in reference to the image data file recording processing, only one folder for image data recording is shown in the figure. The image data files A1-A3 are recorded in the optional folder 221. The image data file A4 has been newly deleted from the folder 221.

As explained earlier, the specific folder 222 is provided to enable the creation of a management file. A management file C4 is recorded in a specific folder 222. Information indicating which image data file has been newly deleted from the optional folder 221 is recorded in the management file C4. In the example presented in FIG. 9, the file name of the image data file A4 is recorded in the management file C4. The management file C4 does not contain any image data, and the minimum volume of information required to identify the image data file A4 is registered in the management file C4.

In FIG. 9, the processing in steps S201-S202 is implemented by the image file processing module in the application program. In step S201, the MPU 21 of the personal computer 2 creates a management file having recorded therein the file name "A4" of the image data file A4 to be deleted from the folder 221 and records the management file assigned with a file named "C4" in the specific folder 222. In step S202, the MPU 21 deletes the image data file A4 recorded in the optional folder 221.

The processing in steps S203-S205 is implemented by the image display processing module in the application program. In step S203, the MPU 21 checks to determine whether or not a file is recorded in the specific folder 222. If a file is recorded in the specific folder 222, the recorded management file (the management file C4 in the example presented in FIG. 9) is read and then the operation proceeds to step S204. In step S204, the MPU 21 identifies the file name of the image data file having been deleted from the folder 221 as "A4". In step S205, the MPU 21 deletes the management file C4 stored in the specific folder 222 and ends the image data file delete processing.

Figure 10:
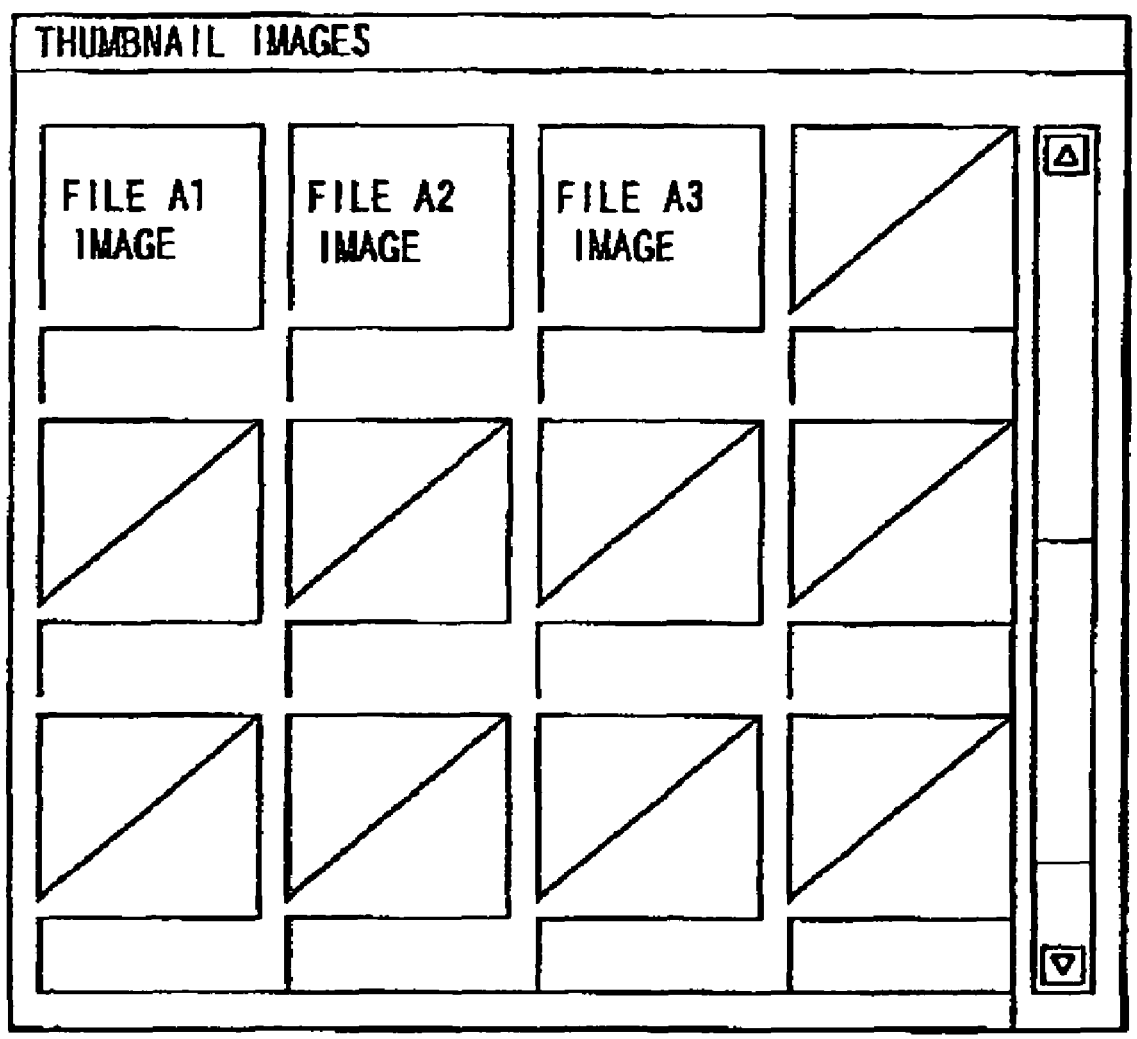
FIG. 10 presents an example of display at the display device in which images corresponding to image data files A1-A3 recorded at arbitrary folders are displayed.

If the application program is programmed to implement thumbnail display of the images corresponding to all the image data files recorded in the folder 221 as described in reference to FIG. 8, the display of the image corresponding to the deleted image data file A4 is halted. In other words, the images corresponding to the image data files A1-A3 recorded in the folder 221 are displayed at the display device 25 as illustrated in FIG. 10.

If, on the other hand, it is decided in step S203 that no file is recorded in the specific folder 222, the MPU 21 continues the display of the images corresponding to the image data files A1-A4 that have been previously read. Namely, unless the management file C4 is recorded in the specific folder 222, no identification can be made with regard to the deletion of the image data file A4 having been recorded in the folder 221. Consequently, the image display shown in FIG. 8, in which the images corresponding to the previously read image data files A1-A4 are on display, is sustained at the display device 25.

The following advantages are achieved in the image data file display device in the first embodiment explained above.

—Prevention of Duplicate File Intake—

(1) The in-taken data management table 601 containing data of the four management items, i.e., the folder name, the file name, the date on which the image data were obtained through photographing and the file size of the image data, corresponding to each set of image data recorded in the recording device 22 of the personal computer 2 is created and recorded in the recording device 22. When the personal computer 2 takes in an image data file from the electronic still camera 1, the electronic still camera 1 first transmits the attribute data alone (step S61) and the personal computer 2 makes a decision as to whether or not there are management item data recorded in the recording device 22 that match the attribute data taken in from the electronic still camera 1 (step S63). Thus, the electronic still camera 1 first transmits only the attribute data with a smaller data volume compared to the image data file before sending the image data file, to enable the personal computer 2 to make a decision as to whether or not the image data file has already been recorded in the recording device 22. As a result, the length of time required for the decision-making process can be reduced compared to the processing in which the image data file is first transmitted and then a decision is made as to whether or not the image data file has already been recorded. In particular, a great advantage is achieved when this feature is adopted in conjunction with image data which are transmitted as large-size data files and require a great deal of time for file transfer.

(2) In addition to the feature in (1), if it is decided that the management item data do not match the attribute data, the image data file is transmitted from the electronic still camera 1 to the personal computer 2 and the image data file is recorded in the recording device 22, whereas if it is decided that the management item data match the attribute data, the image data file is not transmitted from the electronic still camera 1 to the personal computer 2 and, consequently, the image data file is not recorded in the recording device 22. Thus, the recording device 22 does not need to have a large recording capacity since an image data file which has been already recorded is not repeatedly recorded in the recording device 22 of the personal computer 2.

—Identifying Image Data File Being Taken In—

(3) When recording an additional image data file A4 in the folder 221 in the recording device 22 of the personal computer 2, the image data file A4 is recorded in the folder 221 (step S102) and then, the management file B4 having recorded therein the file name of the image data file A4 is recorded as a temporary file in the specific folder 222 (step S103). Once the new image data file A4 is identified, the management file B4 is deleted (S106). This enables the MPU 21 to detect that the image data file A4 has been added in the optional folder 221 through the detection of the creation of the management file B4 in the specific folder 222. As a result, compared to the processing in which the MPU 21 identifies the newly added image data file by referencing all the image data files recorded in the optional folder 221 with the file list, the length of time required for the processing by the MPU 21 is greatly reduced. This feature is particularly advantageous when the number of image data files recorded in the folder 221 is very large since it would take a long time to check all the image data files. In addition, since the management file B4 is created in the folder 222 after the image data file A4 is recorded in the folder 221, it is possible to prevent the MPU 21 from accessing the image data file A4 while it is still in the process of being recorded in the folder 221. Furthermore, since the management file B4 is deleted after the additional image data file A4 is identified, the image data file that has been identified once is not identified again.

—Identifying Image Data File Being Deleted—

(4) When deleting the image data file A4 recorded in the optional folder 221 in the recording device 22 of the personal computer 2, the management file C4 having recorded therein the file name of the image data file A4 is recorded in the specific folder 222 as a temporary file (step S201), and the image data file A4 is deleted from the folder 221 (step S202). Once the image data file A4 that has been deleted is identified, the management file C4 is deleted (S205). This enables the MPU 21 to detect that the image data file A4 has been deleted from the optional folder 221 by detecting the creation of the management file C4 in the specific folder 222. As a result, compared to the processing in which the MPU 21 identifies which image data file has been deleted by referencing all the image data files recorded in the optional folder 221 with the file list, the length of time required for the processing by the MPU 21 is greatly reduced. This feature is particularly advantageous when the number of image data files recorded in the folder 221 is very large since it would take a great deal of time to check all the image data files. In addition, since the image data file A4 is deleted from the folder 221 after the management file C4 is created in the folder 222, it is possible to prevent the MPU 21 from accessing the image data file A4 which is in the process of being deleted from the folder 221. Furthermore, since the management file C4 is deleted after the deleted image data file A4 is identified, the image data file which has been identified once is not identified, again.

While an explanation is given above without setting a specific length of time over which data recorded in the in-taken data management table 601 should be saved, the period over which the data are to be saved may be specified. In such a case, the period over which the data are to be saved, e.g., seven days, is specified in advance, and the data recorded in the management table are erased after the save period. Since a negative decision is made in step S63 as explained earlier once the data are erased, all the image data files are transmitted from the electronic still camera 1 to the personal computer 2. The following advantage is achieved by specifying the data save period in this manner. For instance, when a new image data file is additionally recorded in the CF card 12 from which an image data file previously recorded therein has been transmitted once to the personal computer 2, the image data file in the CF card 12 which has already been recorded in the recording device 22 of the personal computer is not transmitted again during the save period over which the data in the management table are saved. The shorter the period of time having elapsed since an image data file was transmitted from the CF card 12 to the personal computer 2 most recently, the higher the likelihood of the same image data file present in the CF card 12. The object of specifying the data save period is to prevent a single image data file from being transmitted more than once when the same CF card 12 is used repeatedly. When image data files are transmitted to the personal computer 2 after the save period, all the image data files in the CF card 12 are provided to the personal computer 2 and, as a result, the image data files that were sent to the personal computer 2 in the past, too, are transmitted again to enable the personal computer 2 to check all the images in the CF card 12.

In the explanation given above, the image data file name "A4" of the additionally recorded image data file and the image data file name "A4" of the deleted image data file are recorded in the management file B4 and the management file C4 to correlate the management files with the image data file. Instead, a single name may be assigned as the file name of the management file B4 and the file name of the additional image data file A4 and as the file name of the management file C4 and the file name of the image data file A4 to be deleted to achieve a correlation. In such a case, the specific folder 222 and the optional folder 221 achieve a one-to-one relationship.

In addition, file names may be assigned to the management file B4 and the management file C4 by adding path information corresponding to the image data file A4 to the file name "A4" of the image data file to be added and deleted instead. In this case, there are multiple optional folders 221 related to a single specific folder 222.

Furthermore, while the file name "A4" of the additional image data file A and the file name "A4" of the deleted image data file are registered in the management file B4 and the management file C4 in the explanation given above, both the image data file name "A4" and the path information corresponding to the image data file A4 may be registered in the management file B4 and the management file C4. While there is a one-to-one relationship between the specific folder 222 and the optional folder 221 in the first embodiment described above, there are multiple optional folders 221 related to a single specific folder 222 when both the file name "A4" and the path information are registered in the management file B4 and the management file C4.

While an explanation is given above on an example in which the electronic still camera 1 and the personal computer (PC) 2 are connected via the IEEE-1394 cable 3 in the image data file display device, another network cable or an interface device that engages in wireless transmission/reception may be employed instead of the IEEE-1394 cable 3 to connect the electronic still camera 1 and the personal computer (PC) 2 to each other.

In addition, instead of connecting the electronic still camera 1 and the personal computer 2, a CF card read device may be internally provided at the personal computer 2 or a CF card read device may be directly connected to the personal computer 2 to enable the personal computer 2 to directly read recorded data from the CF card 12 into which image data have been recorded by the electronic still camera 1.

Furthermore, the image data file display device may be constituted by connecting a personal computer to a personal computer, or a recording medium to a personal computer or it may be constituted by housing the components in a single housing. When using a recording medium, i.e., when connecting a recording medium such as a CF card to a personal computer, they are connected via a CF card read device or an adapter that converts the CF card interface to another interface such as the USB, Bluetooth or an IrDA. In either case, the present invention may be adopted effectively when a large number of sets of data provided in a large file size such as image data are transferred and recorded in conformance to a specific data communication protocol regardless of whether the individual electronic apparatuses are connected through wired connection or wireless connection.

While an explanation is given above in reference to the first embodiment in which the image data file display device is provided with an file management apparatus, the image data file display processing (the image data file intake/delete processing and the image display processing) described above may be realized in software, stored as a file management program in a recording medium such as a CD-ROM or a floppy disk so that the file management program read by the personal computer can be used to display image data files recorded by the electronic camera by taking the image data files into the personal computer.

Instead of reading the program from the recording medium having recorded therein the image data file management program described above, the image data file management program may be transmitted through a transmission medium such as the Internet. In this case, the transmitted program that has been read by the personal computer is used to implement intake/delete processing and display processing on image data files on the personal computer as described earlier.

Second Embodiment

—Group Management of Continuously Shot Image Files—

During a continuous shooting operation performed in the electronic still camera 1, pictures are taken over several frames within 1 second. As a result, the number of image data files created during a single photographing operation is larger than the number of image data files obtained in an operation in which pictures are taken for one frame at a time. Accordingly, it is more convenient to handle image data obtained through a continuous shooting operation as a group rather than individually handling them in units of single frames. In the image data file display device achieved in the second embodiment of the present invention, a decision is made as to whether or not image data files have been obtained through a continuous shooting operation by using the attribute data of the image data files recorded in the CF card 12, and if it is decided that they have been obtained through a continuous shooting operation, these image data files are managed as a group.

The MPU 21 of the personal computer 2 takes in attribute data indicating the file names 140 and the dates corresponding to all the image data files recorded in the CF card 12 of the electronic still camera 1. Then, the MPU 21 makes a decision as to whether or not the image data files have been obtained through a continuous shooting operation based upon the attribute data thus taken in. FIG. 11 presents an example of the attribute data indicating the file names 140 and the dates having been taken into the personal computer 2. Each set of date information in FIG. 11 includes a date portion 150 and a time point portion 160 and may be obtained from the time stamp used in the DOS format explained earlier. Since the numerical value portions 142 of the file names 140 of these image data files sequentially increase by one at a time, the image data files have been obtained continuously through photographing. Since the date portions 150 all indicate a single date and the time point portions 160 indicate time points close to one another (more accurately, the time points differ from each other by the photographing interval during continuous shooting), the image data are determined to be those obtained through a continuous shooting operation. In this example, the image data files are determined to manifest continuity when the image data files share the same folder name, the values indicated in the numerical value portions 142 of the file names 140 are incremented by one sequentially, the date portions 150 indicate the same date and the time points indicated in the time point portions 160 advance in correspondence to the photographing intervals during a continuous shooting operation.

If the imaged at a files manifest continuity as described above, the MPU 21 determines that they are image data files obtained through a continuous shooting operation and implements group management on them as a set of files. When they are managed as a set of files, either the header portions 141 or the numerical value portions 142 in the file names 140 in FIG. 11 are replaced with specific characters to manage the image data files by using file names such as "G0010004.JPG"- "G0010007.JPG". "G001" indicates the first set of image data files that have been grouped.

Figure 12:
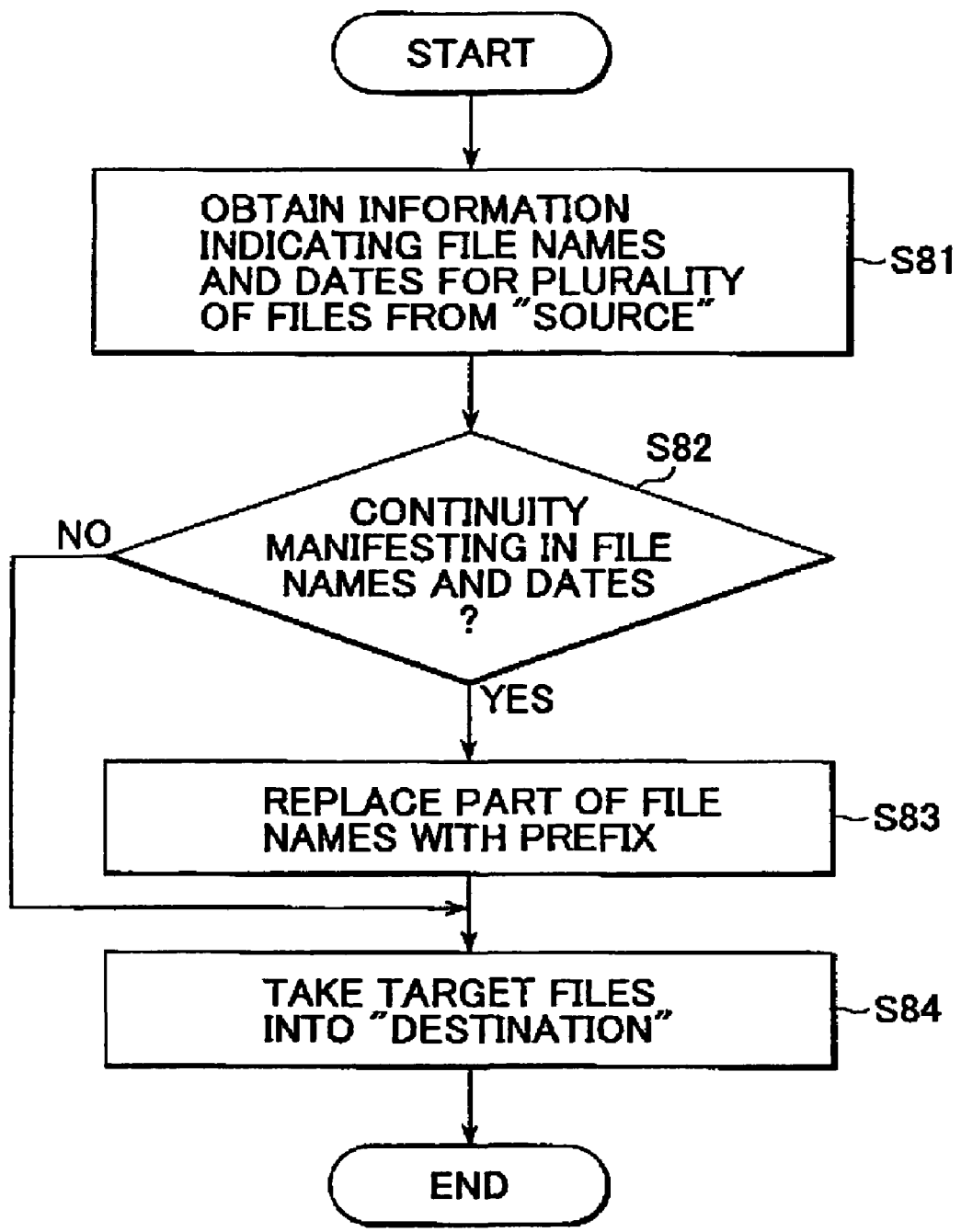
FIG. 12 is a flowchart of the intake processing in which an image data file is taken in at the image data file display device achieved in a second embodiment.

Now, the image data file management processing achieved in the second embodiment is explained in reference to the flowchart in FIG. 12. The program that executes the processing in the flowchart presented in FIG. 12 is started up when the electronic still camera 1 and the personal computer 2 become connected via the IEEE-1394 cable 3 after starting up a specific image data file intake program on the personal computer 2. In step S81, the MPU 21 of the personal computer 2 issues a request to the electronic still camera 1 to transmit only attribute data indicating file names and dates to the personal computer 2. In response to the request for the attribute data, the MPU 11 of the electronic still camera 1 transmits the attribute data indicating the file names and the dates corresponding to a plurality of image data files in the CF card 12 to the personal computer 2. The plurality of image data files in this context refer to all the image data files recorded in the CF card 12.

In step S82, the MPU 21 of the personal computer 2 makes a decision as to whether or not the attribute data taken in from the electronic still camera 1 include data manifesting continuity. If it is decided that there are data manifesting continuity (if an affirmative decision is made in step S82), the operation proceeds to step S83, whereas if it is decided to that there are no data manifesting continuity (if a negative decision is made in step S82), the operation proceeds to step S84.

In step S83, the MPU 21 prepares a prefix "G001" to replace the header portions 141. If continuity manifests over a plurality of instances, prefixes "G002", "G003" . . . are also prepared. In step S84, the MPU 21 issues a request to the electronic still camera 1 to transmit the image data files recorded in the CF card 12 to the personal computer 2. Upon receiving the request for the image data files, the MPU 11 of the electronic still camera 1 transmits the image data files recorded in the CF card 12 to the personal computer 2. The MPU 21 of the personal computer 2 records the files among the image data files thus taken in, which have been determined to manifest continuity in step S82 as described above, in a specific recording area of the recording device 22 by replacing the header portions 141 of their file names with the prefix "G001". Files determined not to manifest continuity, on the other hand, are recorded in specific recording areas of the recording device 22 without changing their file names from those under which they were transmitted from the electronic still camera 1. When all the image data files transmitted from the electronic still camera 1 are recorded in the recording device 22, the MPU 21 ends the processing in FIG. 12.

In the image data file display device achieved in the second embodiment explained above, the electronic still camera 1 first transmits only the attribute data indicating the file names and the dates corresponding to a plurality of image data files recorded in the CF card 12 to the personal computer 2, and the personal computer 2 makes a decision as to whether not the attribute data that have been taken in include any data manifesting continuity (step S82). If it is decided that there are data manifesting continuity, the MPU 21 of the personal computer 2 replaces the file names of the image data files transmitted from the electronic still camera 1 with a prefix that are determined to be image data files obtained through a continuous shooting operation and records them in the recording device 22 in step S84. As a result, the image data files obtained through continuous shooting are managed in a group as a set of files sharing a single prefix, and thus, the file management is facilitated. This feature achieves a great advantage since a particularly large number of image data files are created through continuous shooting.

While the MPU 11 of the electronic still camera 1 transmits the attribute data indicating the file names and the dates corresponding to all the image data files in the CF card 12 to the personal computer 2 (step S81) in explanation given above, attribute data corresponding to image data files recorded in a folder assigned with a pre-specified sub-directory name 130 alone may be transmitted. In such a case, when the MPU 21 of the personal computer 2 records the image data files in a specific recording area of the recording device 22 in step S84, the image data files recorded in the pre-specified folder in the CF card 12 are recorded in the recording device 22.

In addition, while the MPU 21 prepares the prefix "G001" to replace the header portions 141 in step S83 in the explanation given above, a suffix to replace the numerical value portions 142 may be prepared instead.

Third Embodiment

—Prevention of Duplicate File Intake—

In the image data file display device achieved in the third embodiment, specific attribute data of an image data file are pre-specified in the personal computer 2, and the electronic still camera 1 first transmits of attribute data alone when the personal computer 2 takes in image data files from the electronic still camera 1. The personal computer 2 makes a decision as to whether not the pre-specified attribute data match the attribute data taken in from the electronic still camera 1. If it is decided in the personal computer 2 that the attribute data match each other, the electronic still camera 1 transmits the image data file to the personal computer 2.

Figure 13:
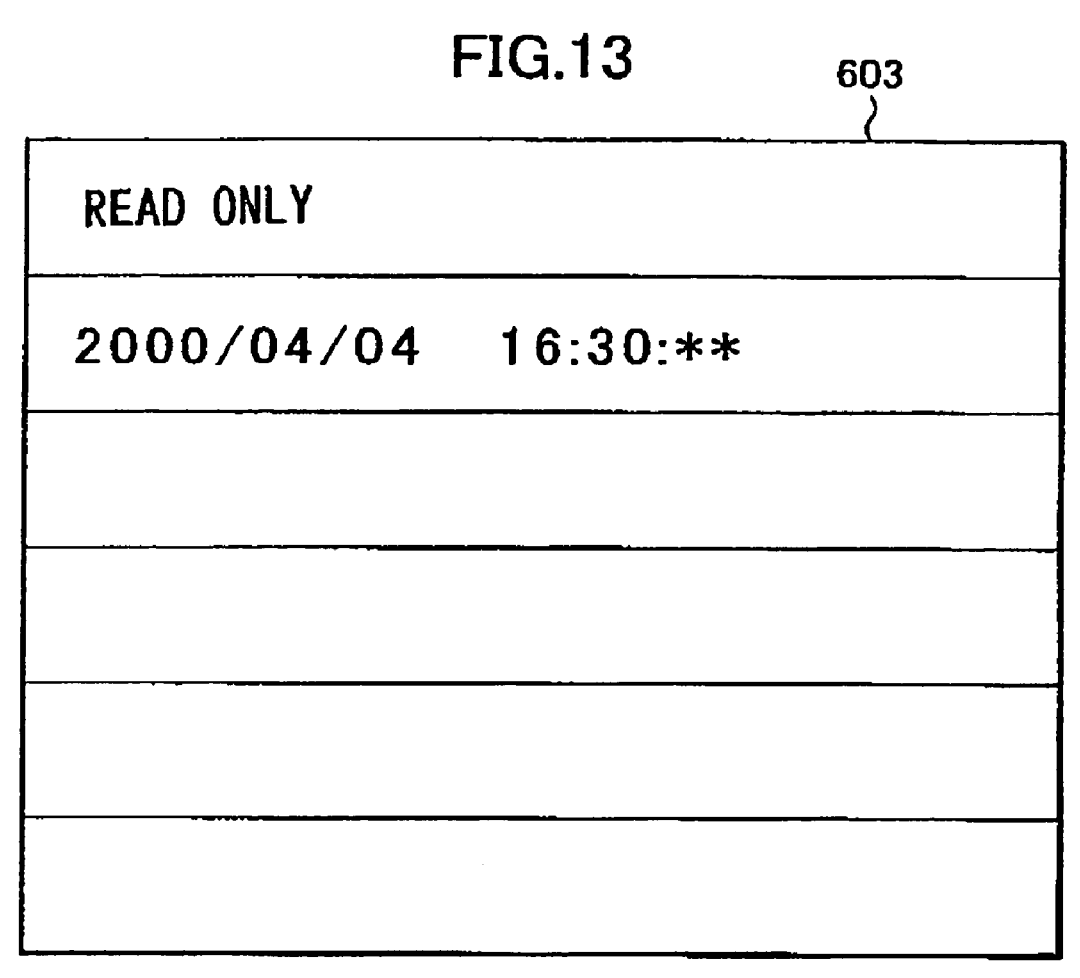

The attribute data of a given set of image data include information indicating "read only", the "hidden file" and the "archive" in the DOS format and the information in the header portion of the image data as well as the folder name, the file name, the filing date ("the date on which the image data were obtained through photographing") and the file size of the image data explained earlier. From these various types of information, a given type of attribute data is specified in advance at the personal computer 2. FIG. 13 shows an intake specification defining table 603 used to specify the attribute data. In FIG. 13, two types of attribute data are specified. The first type of attribute data is "read only" which specifies an image data file assigned with a protect flag so that the file is not erased by mistake. The second type of attribute data is the date that specifies a file obtained through photographing at 16:30 on Apr. 4th, 2000. At least one type of attribute data is specified in advance in the intake specification defining table 603 in this manner.

Figure 14:
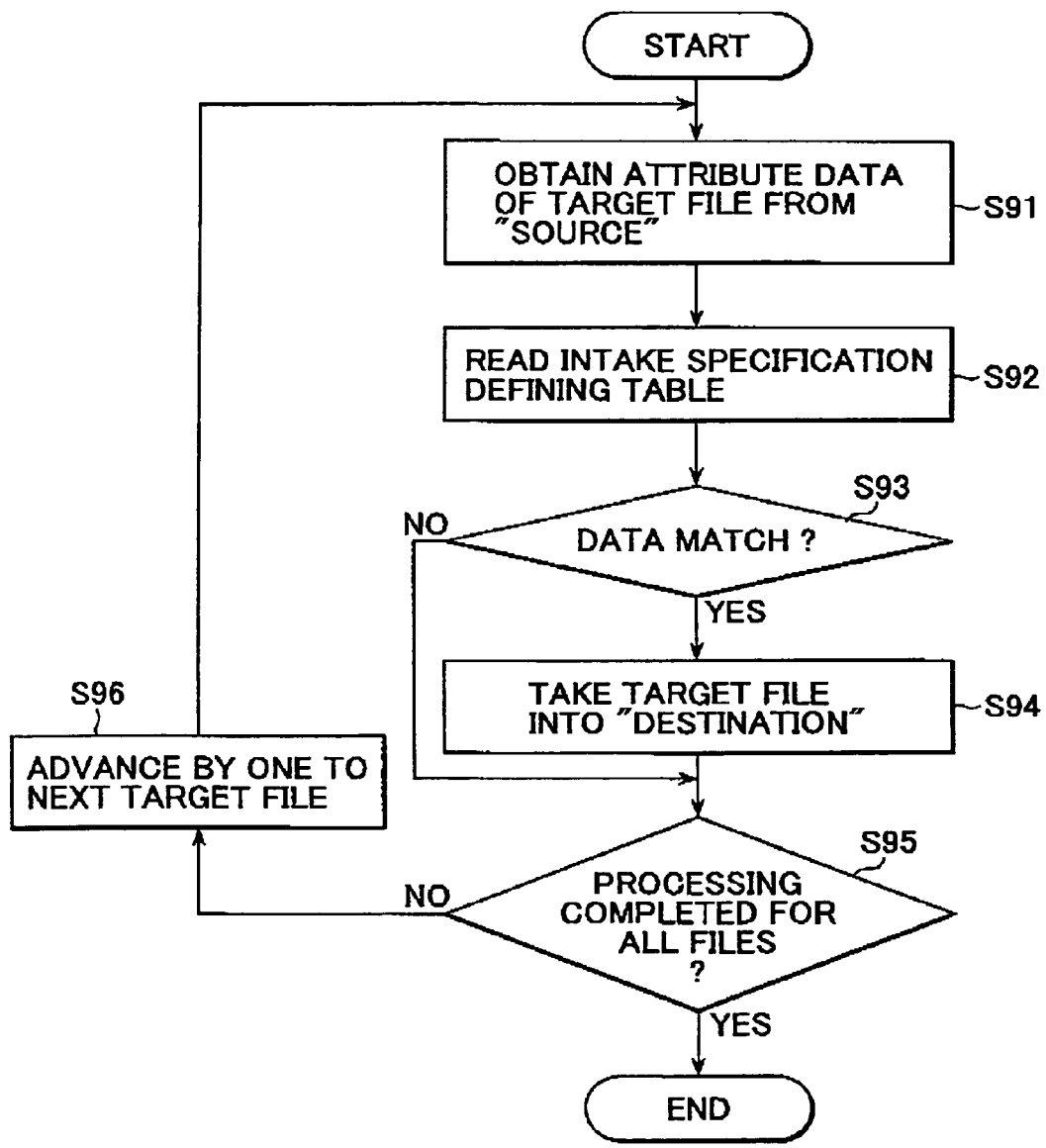
FIG. 14 is a flowchart of the intake processing in which an image data file is taken in at the image data file display device in a third embodiment.

The image data file management processing achieved in the third embodiment is now explained in reference to flow-chart of the processing presented in FIG. 14. The program for implementing the processing in the flowchart in FIG. 14 is started up when the electronic still camera 1 and the personal computer 2 become connected with each other via the IEEE1394 cable 3 after starting up a specific image data file intake program on the personal computer 2.

In step S91, the MPU 21 of the personal computer 2 issues a request to the electronic still camera 1 to transmit the attribute data alone to the personal computer 2. In response to the request for the attribute data, the MPU 11 of the electronic still camera 1 transmits the attribute data of a target file in the CF card 12 to the personal computer 2. When step S91 is implemented for the first time after the processing in FIG. 14 starts, the attribute data of the first file in the CF card 12, i.e. the image data file with the file name "DSCN0001.JPG" within the folder assigned with the folder name "100NIKON" alone are transmitted to the personal computer 2. In step S92, the MPU 21 of the personal computer 2 reads out the intake specification defining table 603 (see FIG. 13) from the recording device 22, and then the operation proceeds to step S93.

In step S93, the MPU 21 makes a decision as to the attribute data specified in the intake specification defining table 603 read out from the recording device 22 match the attribute data having been taken in from the electronic still camera 1. If it is decided that they match (if an affirmative decision is made in step S93), the operation proceeds to step S94. If, on the other hand, it is decided that they do not match (if a negative decision is made in step S93), the operation proceeds to step S95, and in this case, no request is issued to the electronic still camera 1 to transmit an image data file to the personal computer 2. In step S94, the MPU 21 issues a request to the electronic still camera 1 to transmit the image data file, the attribute data of which have been taken in step S91, to the personal computer 2. In response to the request for the image data file, the MPU 11 of the electronic still camera 1 provides the corresponding image data file in the CF card 12 to the personal computer 2. The MPU 21 of the personal computer 2 records the image data file thus taken in a specific recording area of the recording device 22 and then the operation proceeds to step S95.

In step S95, the MPU 11 makes a decision as to whether or not the processing has been completed for all the image data files recorded in the CF card 12. If it is decided that the processing has been completed (if an affirmative decision is made in step S95), an end flag is sent to the personal computer 2 and the processing in FIG. 14 ends. If, on the other hand, it is decided that the processing has not been completed (if a negative decision is made in step S95), the operation proceeds to step S96.

In step S96, the MPU 11 advances by one to the next target file, the attribute data of which are to be taken in from the CF card 12, before the operation returns to step S91.

The following advantages are achieved in the image data file display device in the third embodiment explained above.
(1) Specific attribute data specified by the personal computer 2 by using the intake specification defining table 603 are recorded in the recording device 22. When the personal computer 2 takes in an image data file from the electronic still camera 1, the electronic still camera 1 first transmits the attribute data alone (step S91), and the personal computer 2 makes a decision as to whether the attribute data recorded in the recording device 22 match the attribute data taken in from the electronic still camera 1 (step S93). Thus, the electronic still camera 1 only needs to transmit the attribute data with a small data volume compared to the image data file before actually transmitting the image data file, to enable the personal computer 2 to ascertain whether or not the image data file matching the specified attribute data is present in the electronic still camera 1.

(2) In addition to the feature in (1) above, if it is decided that the specified attribute data match the attribute data transmitted from the electronic still camera 1, the image data file is transmitted from the electronic still camera 1 to the personal computer 2, whereas if it is decided that the specified attribute data do not match the attribute data provided by the electronic still camera 1, the image data file is not transmitted from the electronic still camera 1 to the personal computer 2. Thus, simply by specifying attribute data, required image data can be automatically selected from numerous sets of image data in the electronic still camera 1 to be transmitted to the personal computer 2, thereby making it possible to greatly reduce the length of time required for the intake processing and greatly simplifying the intake processing procedure compared to the processing in which all the image data files are first transmitted from the electronic still camera 1 to the personal computer 2 and then one image data file is selected from them.

Instead of connecting the electronic still camera 1 and the personal computer 2 to each other as explained above, a CF card read device may be internally provided at the personal computer 2 or a CF card read device may be directly connected to the personal computer 2 to enable the personal computer 2 to directly read data recorded in the CF card 12. In this case, the programs in the flow charts presented in FIGS. 6, 12 and 14 explained earlier are started up when the CF card 12 is loaded in the CF card read device. In addition, when this structure is adopted, the processing as being implemented by the MPU 11 of the electronic still camera 1 in the explanation above is implemented by the MPU 21 of the personal computer 2 instead. In other words, unless the CF card read device is internally provided with an MPU, as is the electronic still camera 1, attribute information or image data are received from the CF card read device when the MPU 21 requires the attribute information or the image data.

In addition, image data file management may be implemented to prevent duplicate file intake by connecting an electronic camera to another electronic camera, a personal computer to another personal computer, a recording medium to another recording medium, a camera to a recording medium or a recording medium to a personal computer, or the image data file management may be achieved by housing these components in a single casing. When using a recording medium, e.g., when connecting such as a CF card to a personal computer, they are connected via a CF card read device or an adapter that converts the CF card interface to another interface such as USB, Bluetooth or an IrDA. In either case, the present invention may be adopted effectively when data provided in a large file size such as image data are transferred between electronic apparatuses in conformance to a specific data communication protocol regardless of whether the individual electronic apparatuses are connected through wired connection or wireless connection.

Fourth Embodiment

The image capturing system achieved in the fourth embodiment of the present invention is illustrated in FIG. 1 as is the file display device explained earlier. The image capturing system in the fourth embodiment is characterized in that image data obtained through an image capturing operation performed in the electronic still camera 1 are recorded in both the CF card 12 of the electronic still camera 1 and the recording device 22 of the personal computer 2. When a shutter release operation is performed at the electronic still camera 1, the electronic still camera 1 starts a photographing operation. Image data output from the image capturing element 14 are recorded in the CF card 12 by the MPU 11. The MPU 11 also stores the image data in the transfer buffer memory 131 provided in the interface circuit 13. The image data stored in the transfer buffer memory 131 are transferred to the transfer buffer memory 231 provided at the interface circuit 23 of the personal computer 2 connected via the IEEE-1394 cable 3 and thus are taken into the personal computer 2. The image data taken into the personal computer 2 are read out by the MPU 21 from the transfer buffer memory 231 and are recorded in a specific recording area in the recording device 22.

The image data stored in the transfer buffer memory 131 of the interface circuit 13 are held in the transfer buffer memory 131 until they are transferred to the transfer buffer memory 231 at the interface circuit 23 of the personal computer 2. As a result, when the image data cannot be transferred to the personal computer 2 immediately, the image data are transferred from the transfer buffer memory 131 to the personal computer 2 at a point in time at which an image data transfer is enabled. The image data cannot be transferred immediately in any of the following three situations, for instance. Namely, the electronic still camera 1 and the personal computer 2 are not connected with each other via the IEEE1394 cable 3, an error has occurred in either the interface circuit 13 or the interface circuit 23 resulting in a transfer failure or a recording-ready state has not been achieved since the capacity at the recording device 22 is insufficient or no medium has been loaded.

When the transfer of the image data from the transfer buffer memory 131 to the personal computer 2 is completed, the MPU 11 deletes the transferred image data in the transfer buffer memory 131. The MPU 11 detects the transfer end by checking a flag separately provided at the interface circuit 13. Based upon whether or not the image data stored in the transfer buffer memory 131 have been transferred, a decision is made as to whether or not the image data can be recorded in the recording device 22 of the personal computer 2. If it is decided that a state in which the image data can be recorded in the recording device 22 of the personal computer 2 has not been achieved, the MPU 11 does not delete the image data in the transfer buffer memory 131.

If the transfer buffer memory 131 of the interface circuit 13 at the electronic still camera 1 has a storage area for image data corresponding one photographing operation, the MPU 11 records image data to be transferred at the CF card 12 until the transfer buffer memory 131 becomes available in response to a new shutter release operation performed while untransferred image data are stored in the transfer buffer memory 131. The image data recorded in the CF card 12 through this process are managed by the MPU 11 as image data to be transferred to the personal computer 2 which are different from the image data recorded in the CF card 12 after the photographing operation starts. In response to the shutter release operation, the MPU 11 implements a photographing operation and records the image data in the CF card 12, and the MPU also checks to ascertain whether not there are any image data to be transferred to the personal computer 2 remaining either in the transfer buffer memory 131 or the CF card 12.

The MPU 11 disallows the transfer of the image data to be recorded in the personal computer 2 if there are untransferred image data stored in the transfer buffer memory 131 of the interface circuit 13, i.e., if the image data cannot be recorded in the recording device 22 of the personal computer 2. Namely, the recording operation for recording the image data at the personal computer 2 is halted. When the transfer buffer memory 131 of the interface circuit 13 becomes available, i.e., when it becomes possible to record image data in the recording device 22 of the personal computer 2, the MPU 11 transfers the image data to be recorded to the personal computer 2. Namely, an operation for recording image data is started at the personal computer 2.

The MPU 21 of the personal computer 2 monitors to ascertain whether or not any image data are stored in the transfer buffer memory 131 of the interface circuit 13 at the electronic still camera 1 via the interface circuit 23 and the IEEE-1394 cable 3. If there are image data stored in the transfer buffer memory 131, the MPU 21 receives the stored image data and stores them in the transfer buffer memory 231 in the interface circuit 23. The MPU 21 reads out the image data from the transfer buffer memory 231 and records them in a specific recording area of the recording device 22. Then, the MPU 21 deletes the recorded image data in the transfer buffer memory 231.

Figure 15:
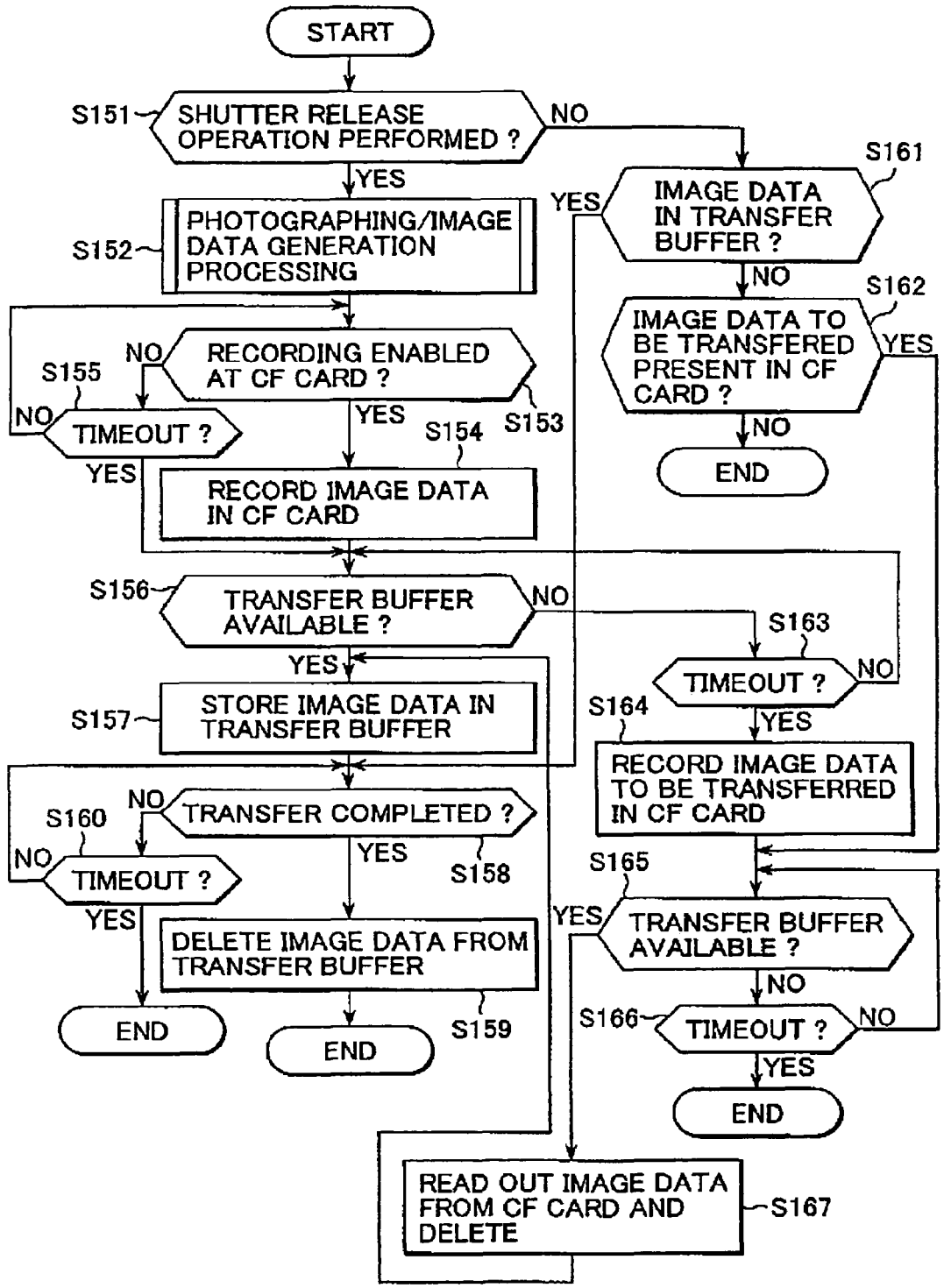
FIG. 15 is a flowchart of the processing implemented by the MPU of the electronic still camera in the image capturing system achieved in a fourth embodiment.

FIG. 15 is a flowchart of the processing performed by the MPU 11 of the electronic still camera 1 in the image capturing system described above. In step S151 in FIG. 15, the MPU 11 makes a decision as to whether or not a shutter release operation has been performed. If an affirmative decision is made, i.e., if it is decided that a shutter release operation has been performed, the operation proceeds to step S152 in which photographing processing and image data generation processing are implemented. In step S153, the MPU 11 makes a decision as to whether or not image data can be recorded in the CF card 12. The image data cannot be recorded in the CF card 12 if the CF card 12 is not correctly loaded in the electronic still camera 1 or if the recording capacity of the CF card 12 is insufficient. If an affirmative decision is made in step S153, i.e., if it is decided that a recording operation can be performed, the operation proceeds to step S154. In step S154, the MPU 11 records the image data in a specific recording area of the CF card 12.

If a negative decision is made in step S153, on the other hand, the operation proceeds to step S155 to perform timer processing over a specific length of time. Until it is decided in step S155 that a timeout has occurred (as long as a negative decision is made in step S155), the operation returns to step S153 to repeat the decision-making processing, and once it is decided in step 5155 that a timeout has occurred (once an affirmative decision is made in step S155), the operation proceeds to step S156. In step S156, the MPU 11 makes a decision as to whether or not the transfer buffer memory 131 has become available for use. If it is decided in step S156 that the transfer buffer memory 131 is available for use, i.e., if an affirmative decision is made, the operation proceeds to step S157. In step S157, the MPU 11 stores the image data in the transfer buffer memory 131 and then the operation proceeds to step S158.

In step S158, the MPU makes a decision as to whether or not of the transfer of the image data stored in the transfer buffer memory 131 has been completed. If an affirmative decision is made in step S158, the operation proceeds to step S159 in which the MPU 11 deletes the transferred image data stored in the transfer buffer memory 131 before ending the processing shown in FIG. 15. If, on the other hand, a negative decision is made in step S158, the operation proceeds to step S160, in which timer processing is implemented over a specific length of time. Until it is decided in step S160 that a timeout has occurred (as long as a negative decision is made in step S160), the operation returns to step S158 to repeat the decision-making processing, and once it is decided in step S160 that a timeout has occurred (once an affirmative decision dismayed in step S160), the processing in FIG. 15 ends with the untransferred image data left in the transfer buffer memory 131.

Now, an explanation is given on the processing performed when a negative decision is made in step S156. If it is decided in step S156 that the transfer buffer memory 131 is not available, i.e., if a negative decision is made in step S156, the operation proceeds to step S163 to implement timer processing over a specific length of time. Until it is decided in step S163 that a timeout has occurred (as long as a negative decision is made in step S163), the operation returns to step S156 to repeat the decision-making processing, and once a decision is made in step S163 that a timeout has occurred (once an affirmative decision is made in step S163), the operation proceeds to step S164. In step S164, the MPU 11 records the transfer image data in the CF card 12 before the operation proceeds to step S165. In step S165, the MPU 11 makes a decision as to whether or not the transfer buffer memory 131 has become available for use. If an affirmative decision is made in step S165, i.e., if it is decided that the transfer buffer memory 131 is available for use, the operation proceeds to step S167. In step S167, the MPU 11 reads out the transfer image data from the CF card 12 and deletes the image data from the CF card 12 before the operation proceeds to step S157.

If a negative decision is made in step S165, the operation proceeds to step S166 to implement timer processing over a specific length of time. Until it is decided in step S166 that timeout has occurred (as long as a negative decision is made in step S166), the operation returns to step S165 to repeat the decision-making process, and once it is decided in step S166 that a timeout has occurred (once an affirmative decision is made in step S166), the processing in FIG. 15 ends with the untransferred image data left in the CF card 12.

An explanation is now given on the processing performed when a negative decision is made in step S151. If it is decided in step S151 that a shutter release operation has not been performed, the operation proceeds to step S161 to make a decision as to whether or not there are any untransferred image data left in the transfer buffer memory 131. If an affirmative decision is made in step S161, i.e. if it is decided in step S161 that there are untransferred image data, the operation proceeds to step S158, whereas if a negative decision is made in step S161, the operation proceeds to step S162. In step S162, a decision is made as to whether or not there are any image data left untransferred in the CF card 12. If an affirmative decision is made in step S162, i.e., if it is decided in step S162 that there are untransferred image data, the operation proceeds to step S165, whereas if a negative decision is made in step S162, the processing in FIG. 15 ends.

Figure 16:
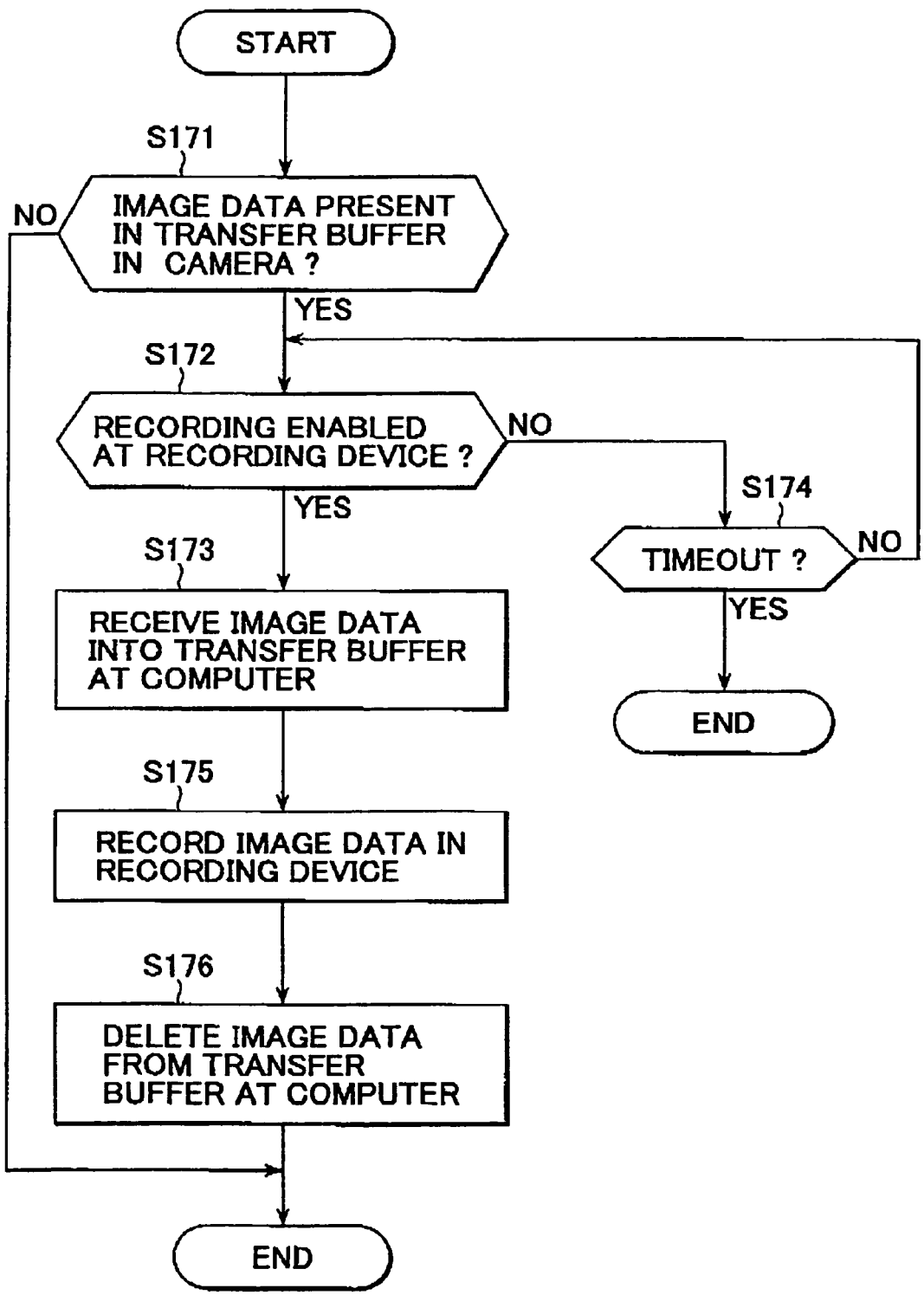
FIG. 16 is a flowchart of the processing implemented by the MPU of the personal computer in the image capturing system achieved in the fourth embodiment.

FIG. 16 is a flowchart of the processing implemented by the MPU 21 of the personal computer 2 in the image capturing system explained above. In step S171 in FIG. 16, the MPU 21 makes a decision as to whether not any image data are stored in the transfer buffer memory 131 of the electronic still camera 1. If an affirmative decision is made in step S171, the operation proceeds to step S172, whereas if a negative decision is made in step S171, the processing in FIG. 16 ends.

In step S172, the MPU 21 makes a decision as to whether or not image data can be recorded in the recording device 22. It is sometimes not possible to record image data in the recording device 22 due to insufficient recording capacity or the like. If an affirmative decision is made in step S172, i.e., if it is decided in step S172 that a recording operation is enabled, the operation proceeds to step S173. In step S173, the MPU 21 receives the image data from the transfer buffer memory 131 of the electronic still camera 1 and stores the received image data in the transfer buffer memory 231 in the interface circuit 23, before the operation proceeds to step S175. It is to be noted that the transfer buffer memory 231 of the interface circuit 23 has a storage area for image data corresponding to one photographic operation as does the transfer buffer memory 131 of the electronic still camera 1. In step S175, the MPU 21 reads out the image data from the transfer buffer memory 231 and records the image data in a specific recording area of the recording device 22. The MPU 21 deletes the recorded image data in the transfer buffer memory 231 in step S176 and the processing in FIG. 16 ends.

If, on the other hand, a negative decision is made in step S172, the operation proceeds to step S174 to implement timer processing over a specific length of time. Until it is decided in step S174 that a timeout has occurred (as long as a negative decision is made in step S174), the operation returns to step S172 to repeat the decision-making processing and once it is decided in step S174 that a timeout has occurred (once an affirmative decision is made in step S174), the processing in FIG. 16 ends.

The following advantages are achieved in the image capturing system in the fourth embodiment explained above.

(1) Image data obtained through an image capturing operation performed in the electronic still camera 1 are recorded both in the CF card 12 of the electronic still camera 1 and in the recording device 22 of the personal computer 2. Thus, the image data are recorded at two locations for management, and even if the image data become lost at one location, the image data at the other location can be utilized.

(2) When image data cannot be recorded in the CF card 12 of the electronic still camera 1, the image data are recorded in the recording device 22 of the personal computer 2. Since the recording capacity of the recording device 22 at the personal computer 2 is normally larger than that of the CF card 12, a larger volume of image data can be recorded compared to the volume of image data recorded only in the CF card 12. As a result, a new photographing operation can be performed even when the available capacity of the CF card 12 is insufficient.

(3) If image data obtained through an image capturing operation performed in the electronic still camera 1 cannot be immediately transferred to the personal computer 2 to be recorded in the recording device 22, the image data to be transferred to the personal computer 2 are held in the transfer buffer memory 131 of the electronic still camera 1. In addition, if untransferred image data corresponding to one photographing operation are already stored in the transfer buffer memory 131, the image data to be transferred are stored in the CF card 12. Once it becomes possible to transfer the image data to the personal computer 2 and record them in the recording device 22, the image data stored in the transfer buffer memory 131 and the untransferred image data recorded in the CF card 12 are transferred from the electronic still camera 1 to the personal computer 2 and are recorded in the recording device 22. Thus, even when there is a failure at the personal computer 2 disabling an operation for recording image data, the photographing operation can be performed continuously with the image data recorded in the camera by the electronic still camera 1, and then, once the problem has been resolved, the image data having been recorded in the camera can be recorded in the recording device 22 of the personal computer 2.

In the image capturing system is explained above, image data obtained through an image capturing operation performed at the electronic still camera 1 are recorded in the CF card 12 of the electronic still camera 1 and in the recording device 22 of the personal computer 2 so that the photographing operation can be performed continuously with the image data recorded in the electronic still camera 1 even when the image data obtained through image capturing cannot be immediately transferred to the personal computer 2 to be recorded in the recording device 22. Instead, the image data obtained through the image capturing operation performed at the electronic still camera 1 may be recorded only in the recording device 22 of the personal computer 2. In this case, if the image data obtained through an image capturing operation performed at the electronic still camera 1 cannot be immediately transferred to the personal computer 2 to be recorded in the recording device 22, the photographing operation is performed continuously by recording the image data at the electronic still camera 1, and once the problem is resolved, the image data having been recorded in the camera are recorded in the recording device 22 of the personal computer 2.

Fifth Embodiment

In the image capturing system in the fourth embodiment explained above, no image data are recorded in the electronic still camera 1 if image data cannot be recorded in the CF card 12 (if a negative decision is made in step S153). In the image capturing system achieved in the fifth embodiment of the present invention, however, even when image data cannot be recorded in the CF card 12, the image data recorded in the recording device 22 of the personal computer 2 are read out and transferred to the electronic still camera 1 and the transferred image data are then recorded in the CF card 12 when it becomes possible later to record image data in the CF card 12.

Figure 17:
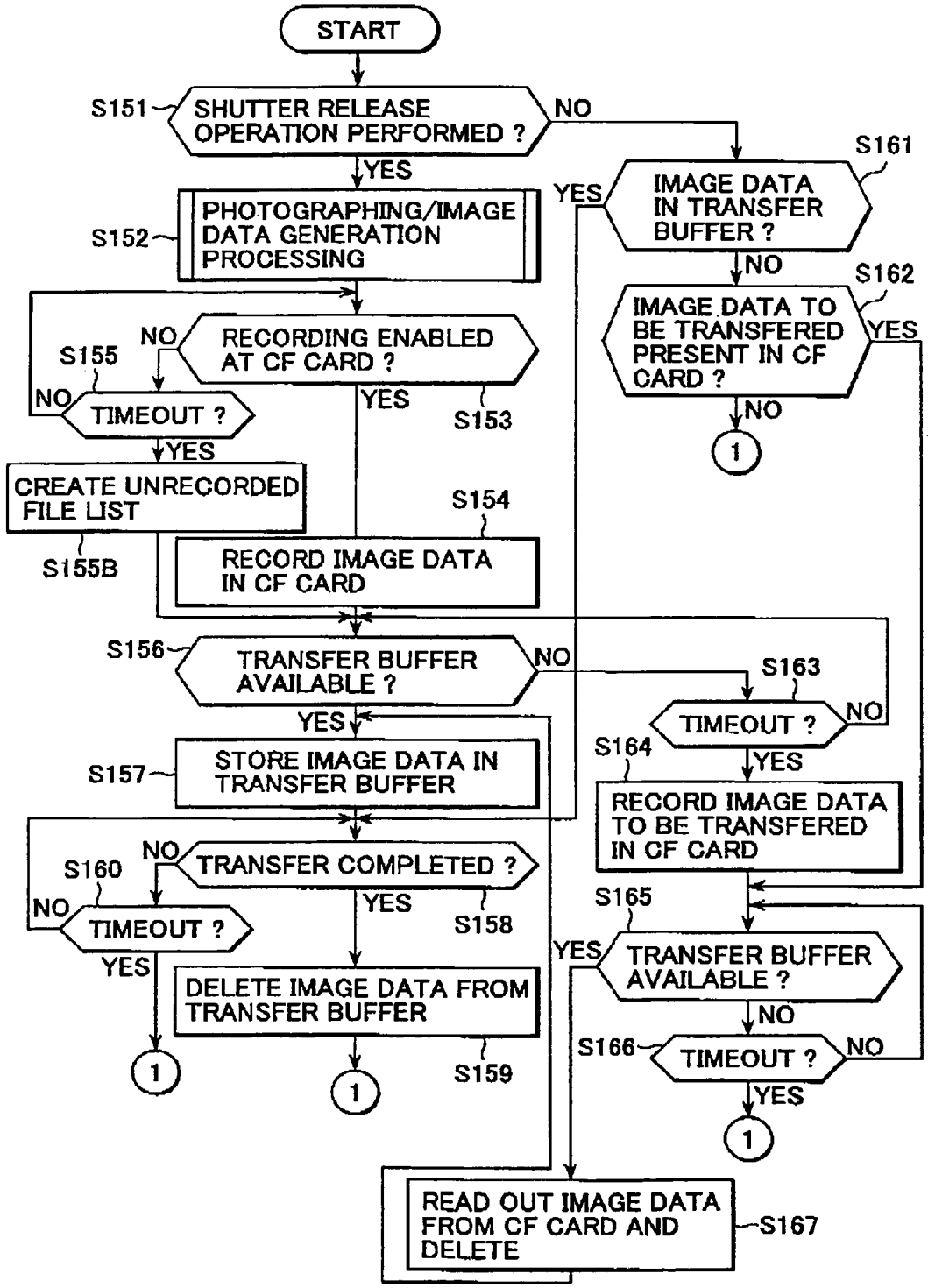
FIG. 17 is a flowchart of the first half of the processing implemented by the MPU of the electronic still camera in the image capturing system achieved in a fifth embodiment.

FIG. 17 presents a flowchart of the processing implemented by the MPU 11 of the electronic still camera 1 in the image capturing system in the fifth embodiment. In FIG. 17, the same step numbers are assigned to steps in which processing identical to the processing implemented in the fourth embodiment is executed. The flowchart in FIG. 17 differs from that in FIG. 15 in that step S155B, which is implemented if an affirmative decision is made in step S155, is added and in that the operation shifts to new processing shown in FIG. 18 to be detailed later when the processing in FIG. 15 ends. Accordingly, an explanation is given below by focusing on these differences.

If an affirmative decision is made in step S155, i.e., if it is decided that a timeout has occurred in step S155 in FIG. 17, the operation proceeds to step S155B. In step S155B, the MPU 11 creates an unrecorded data list having registered therein information with regard to the image data which have not been recorded in the CF card 12 and records the list alone in a memory (not shown) internally provided in the MPU 11, before the operation proceeds to step S156.

Figure 18:
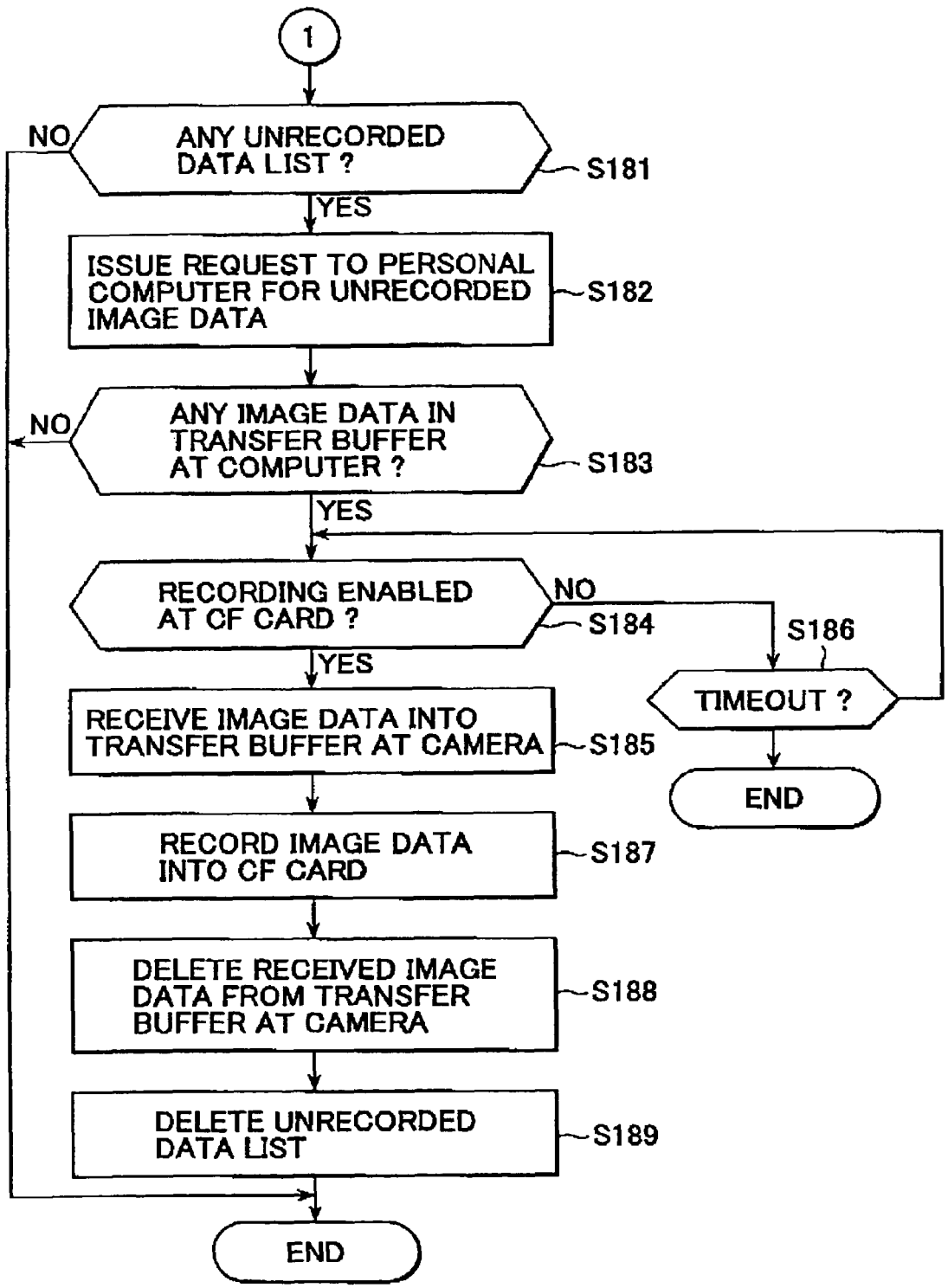
FIG. 18 is a flowchart of the second half of the processing implemented by the MPU of the electronic still camera in the image capturing system achieved in the fifth embodiment.

FIG. 18 is a flowchart of the second half of the processing implemented by the MPU 11 of the electronic still camera 1 in the image capturing system achieved in the fifth embodiment. The operation proceeds to implement the processing in the flowchart presented in FIG. 18 after the processing in step S159 in FIG. 17 is executed, after an affirmative decision is made in step S160 in FIG. 17, after a negative decision is made in step S162 in FIG. 17 or after an affirmative decision is made in step S166 in FIG. 17. In step S181 in FIG. 18, the MPU 11 makes a decision as to whether or not the memory in the MPU 11 contains the unrecorded data list mentioned above. If an affirmative decision is made in step S181, the operation proceeds to step S182 in which the MPU 11 issues a request to the personal computer 2 for the image data, the information regarding which is registered in the unrecorded data list via the interface circuit 13 before the operation proceeds to step S183. If, on the other hand, a negative decision is made in step S181, the processing in FIG. 18 ends.

In step S183, the MPU 11 makes a decision as to whether or not image data are stored in the transfer buffer memory 231 of the personal computer 2. If an affirmative decision is made in step S183, the operation proceeds to step S184, whereas if a negative decision is made in step S183, the processing in FIG. 18 ends. In step S184, the MPU 11 makes a decision as to whether or not the image data can be recorded in the CF card 12. If an affirmative decision is made in step S184, i.e., if it is decided it that the image data can be recorded, the operation proceeds to step S185.

In step S185, the MPU 11 receives the image data from the transfer buffer memory 231 and stores them in the transfer buffer memory 131 in the interface circuit 13 before the operation proceeds to step S187. In step S187, the MPU 11 reads out the image data from the transfer buffer memory 131 and records the image data in a specific recording area of the CF card 12. In step S188, the MPU 11 deletes the recorded image data from the transfer buffer memory 131 before the operation proceeds to step S189. In step S189, the MPU 11 deletes the information regarding the recorded image data from the unrecorded data list and then the processing in FIG. 18 ends.

If a negative decision is made in step S184, on the other hand, the operation proceeds to step S186 to implement timer processing over a specific length of time. Until it is decided in step S186 that a timeout has occurred (as long as a negative decision is made in step S186), the operation returns to step S184 to repeat the decision-making processing, and once it is decided in step S186 that a timeout has occurred (once an affirmative decision is made in step S186) the processing in FIG. 18 ends.

Figure 19:
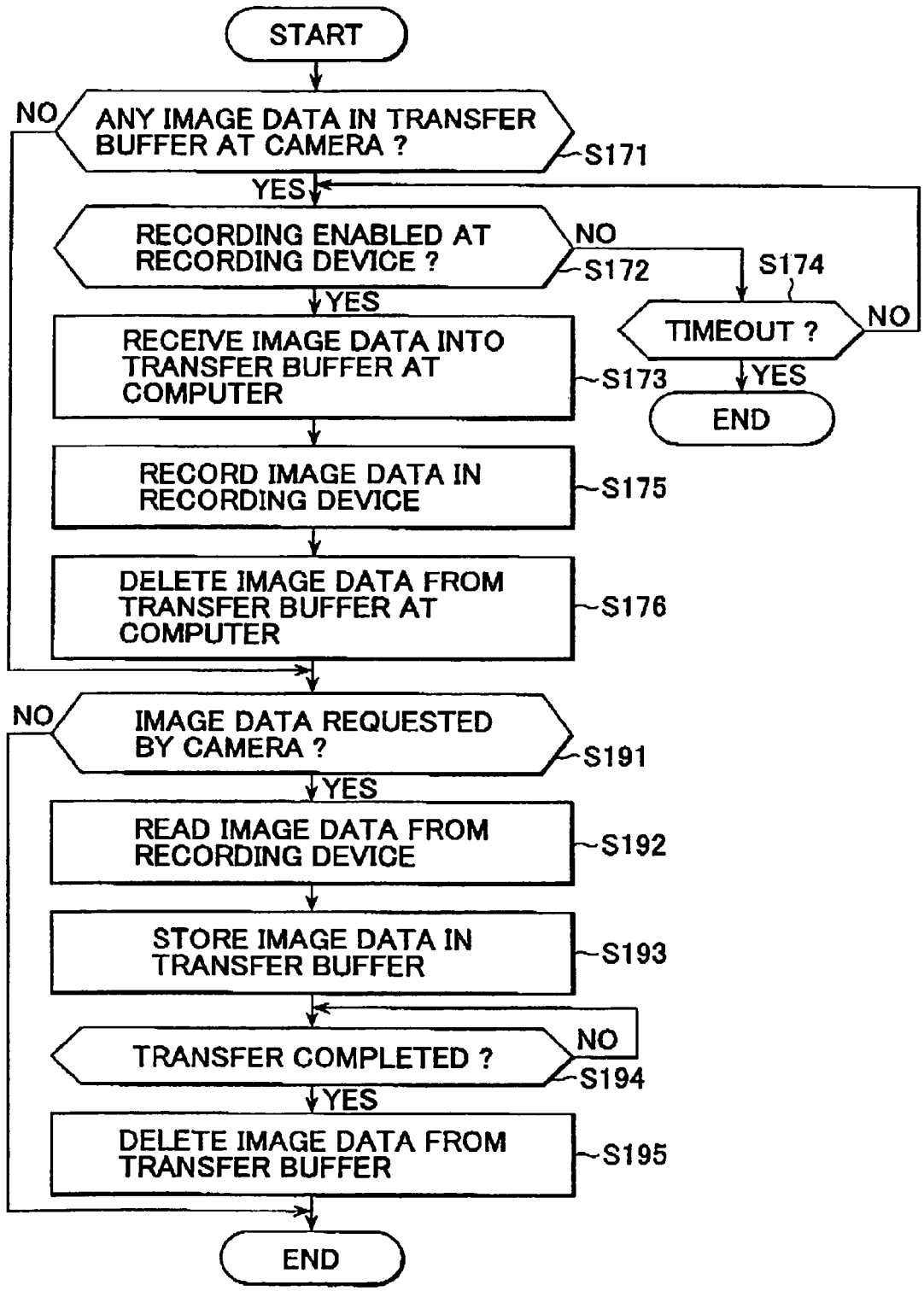
FIG. 19 is a flowchart of the processing implemented by the MPU of the personal computer in the image capturing system achieved in the fifth embodiment.

FIG. 19 is a flowchart of the processing implemented by the MPU 21 of the personal computer 2 in the image capturing system achieved in the fifth embodiment. The processing is achieved by adding steps S191-S195 to be implemented after step S176 in the processing presented in FIG. 16 illustrating the fourth embodiment. Accordingly, an explanation is given below by focusing on the processing implemented in and after step S191. In step S191 in FIG. 19, the MPU 21 makes a decision as to whether or not there has been a request for image data issued to the interface circuit 23 from the MPU 11 of the electronic still camera 1. If an affirmative decision is made in step S191, the operation proceeds to step S192 in which the MPU 21 reads out the requested image data from the recording device 22. If, on the other hand, a negative decision is made in step S191, the processing in FIG. 19 ends. In step S193, the MPU 21 stores the image data that have been read out in the transfer buffer memory 231 before the operation proceeds to step S194.

In step S194, the MPU 21 makes a decision as to whether or not the transfer of the image data stored in the transfer buffer memory 231 has been completed. If an affirmative decision is made in step S194, the operation proceeds to step S195 in which the MPU 21 deletes the transferred image data stored in the transfer buffer memory 131 before the processing in FIG. 19 ends. If a negative decision is made in step S194, however, the decision-making processing in step S194 is repeated.

In the image capturing system in the fifth embodiment explained above, if the image data obtained through an image capturing operation performed at the electronic still camera 1 cannot be immediately recorded in the CF card 12, the image data are transferred to the personal computer 2 and are recorded in the recording device 22, and an unrecorded data list having registered therein information regarding the unrecorded image data is created. Once the CF card 12 of the electronic still camera 1 enters an image data recording enabled state, the electronic still camera 1 issues a request for the image data registered in the unrecorded data list to the personal computer 2 and the requested image data are read out from the recording device 22 of the personal computer 2. These image data are transferred from the personal computer 2 to the electronic still camera 1 where they are recorded in the CF card 12. As a result, even when the image data cannot be recorded in the CF card 12, the photographing operation can be continuously performed by having the image data transferred from the electronic still camera 1 to the personal computer 2 and recorded in the personal computer 2. Then when the problem at the CF card 12 is resolved, the image data recorded in the personal computer 2 can be recorded in the CF card 12 of the camera.

In the image capturing system explained above, the image data obtained through an image capturing operation performed at the electronic still camera 1 are recorded both in the CF card 12 of the electronic still camera 1 and in the recording device 22 of the personal computer 2 so that even when the image data resulting from the image capturing operation cannot be immediately recorded in the CF card 12, the photographing operation can be continued by transferring the image data to the personal computer 2 and recording them in the recording device 22. Instead, the image data obtained by performing an image capturing operation at the electronic still camera 1 may be recorded in the CF card 12 of the electronic still camera 1 alone. In this case, if the image data obtained through the image capturing operation cannot be immediately recorded in the CF card 12, the photographing operation is allowed to continue at the electronic still camera 1 by transferring the image data to the personal computer 2 where they are recorded in the recording device 22, and when the problem at the CF card 12 is resolved, the image data recorded in the personal computer 2 are transferred to the electronic still camera 1 to e recorded in the CF card 12.

Alternatively, the image data obtained through an image capturing operation performed at the electronic still camera 1 may be recorded in the recording device 22 of the personal computer 2 alone. In this case, if the image data obtained by performing the image capturing operation at the electronic still camera 1 cannot be immediately transferred to the personal computer 2 and recorded in the recording device 22, the photographing operation is allowed to continue at the electronic still camera 1 by recording the image data in the CF card 12 of the electronic still camera 1. Once it becomes possible to transfer the image data to the personal computer 2 to be recorded in the recording device 22, the image data having been recorded in the CF card 12 of the electronic still camera 1 are transferred to the personal computer 2 and recorded in the recording device 22.

While an explanation is given above on an example in which the electronic still camera 1 and the personal computer (PC) 2 are connected via the IEEE-1394 cable 3 in the image capturing system, another type of network cable may be used instead of the IEEE-1394 cable 3 or the electronic still camera 1 and the personal computer (PC) 2 may be connected by using an interface device that engages in wireless transmission/reception. The interface that is used in such an application may be USB, Bluetooth, IrDA or the like. In any case, the present invention may be adopted when transferring and recording image data in conformance to a specific data communication protocol between various electronic apparatuses regardless of whether they are connected through wiring or through a wireless connection.

In addition, the present invention may be adopted in a system achieved by connecting the electronic still camera 1 to a printer, the electronic still camera 1 to a TV monitor or the electronic still camera 1 to a telephone instead of connecting the electronic still camera 1 to the personal computer 2.

Furthermore, the present invention may be adopted in a system constituted by using an electronic apparatus internally provided with a camera such as a personal computer internally provided with a camera, instead of the electronic still camera 1.

While an explanation is given above on an example in which the transfer buffer memory 131 and the transfer buffer memory 231 each have an area for storing image data corresponding to a single photographing operation they may each be provided with an area for storing image data corresponding to a plurality of photographing operations. In such a case, image data obtained through a plurality of photographing operations stored in the transfer buffer memory 131 and the transfer buffer memory 231 can be transferred in a batch.

Sixth Embodiment

Figure 20:
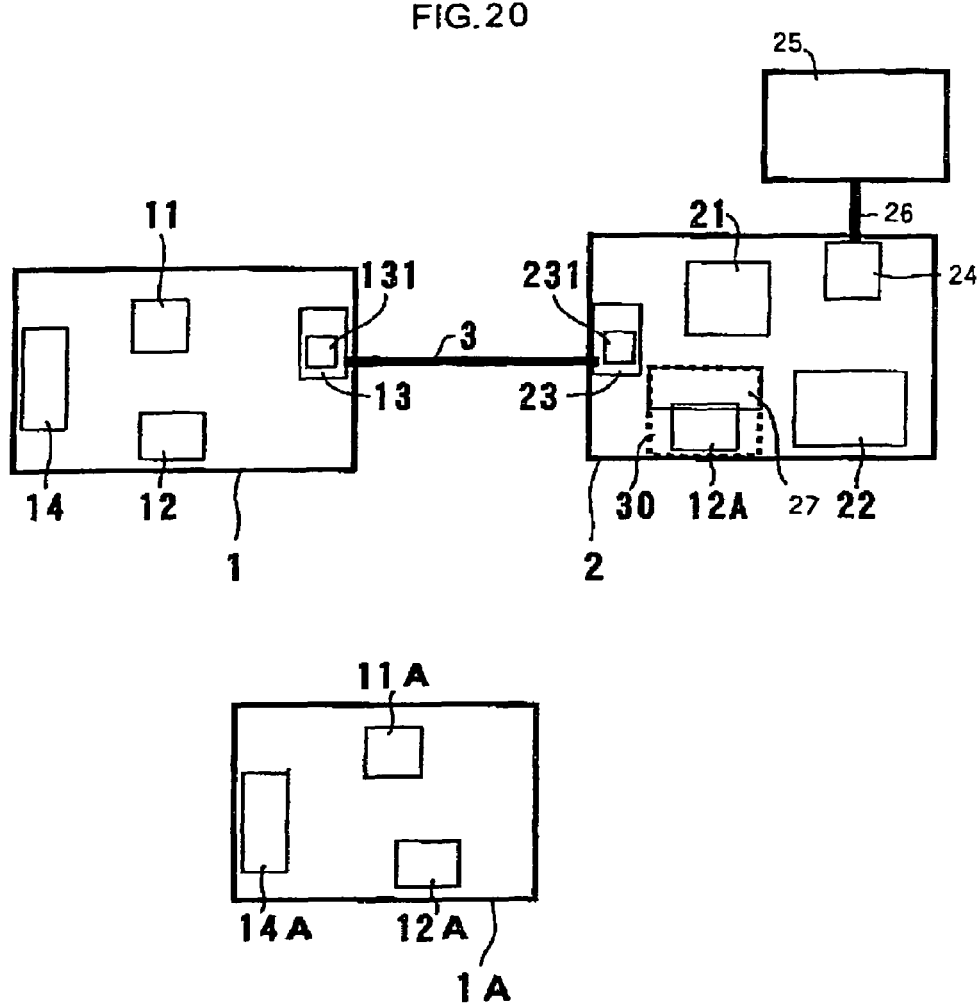
FIG. 20 schematically illustrates the image data handling apparatus achieved in a sixth embodiment.

In the image data handling apparatus achieved in the sixth embodiment of the present invention, a CF card disengaged from an electronic still camera other than the electronic still camera connected to the apparatus is loaded into the apparatus. FIG. 20 schematically illustrates the image data handling apparatus in the sixth embodiment. In FIG. 20, an image data handling apparatus 2 is connected to an electronic still camera 1 via an IEEE-1394 cable 3. The electronic still camera 1 includes an MPU 11, a CF card 12, an interface circuit 13 and an image capturing element 14. The CF card 12, which is detachably provided at the electronic still camera 1, is loaded in the electronic still camera 1 for use during a photographing operation. A transfer buffer memory 131 is provided at the interface circuit 13.

The electronic still camera 1 records image data obtained by performing an image capturing operation at the image capturing element 14 in the CF card 12 in a specific format. In addition, in order to transfer the image data obtained through a photographing operation to the image data handling apparatus 2 via the interface circuit 13 and the IEEE-1394 cable 3, the electronic still camera 1 stores the image data in the transfer buffer memory 131 internally provided at the interface circuit 13. The operation of the electronic still camera 1 is controlled by the MPU 11.

The image data handling apparatus 2 may be constituted of, for instance, a personal computer. The image data handling apparatus 2 includes an MPU 21, a recording device 22, an interface circuit 23, a card read circuit 27, a display circuit 24 and a display device 25. A transfer buffer memory 231 is provided at the interface circuit 23. The image data transmitted from the electronic still camera 1 via the IEEE-1394 cable are input to the image data handling apparatus 2 through the interface circuit 23. The image data thus taken into the image data handling apparatus 2 are recorded in a specific recording area in the recording device 22. The image data recorded in the recording device 22 are then read out from the recording device 22 and converted to an image signal at the display circuit 24. The image signal is displayed at the display device 25 connected to the image data handling apparatus 2 via an image signal cable 26. The operation of the image data handling apparatus 2 is controlled by the MPU 21.

A slot 30 in which a PC card is loaded is provided at the image data handling apparatus 2. By attaching an adapter (not shown) to the CF card 12, the CF card 12 can be loaded into the PC card slot 30. The data in the CF card 12 loaded in the PC card slot 30 are read out by the card read circuit 27 in response to a command issued by the MPU 21. As a result, the MPU 21 is allowed to directly read out the image data recorded in the CF card 12 loaded in the PC card slot 30 without having to read them via the IEEE-1394 cable 3.

An electronic still camera 1A which is similar to the electronic still camera 1 records image data obtained through an image capturing operation performed at an image capturing element 14A in a CF card 12A in a specific format. The CF card 12A which is provided detachably at the electronic still camera 1A is loaded in the electronic still camera 1A for use during a photographing operation. The operation of the electronic still camera 1A is controlled by an MPU 11A. In FIG. 20, the CF card 12A having been taken out from the electronic still camera 1A is loaded in the PC card slot 30 of the image data handling apparatus 2 with an adapter attached thereto. In the CF card 12A, image data obtained through a photographing operation performed while the CF card 12A was loaded in the electronic still camera 1A are recorded.

The image data taken into the image data handling apparatus 2 from the electronic still camera 1 are displayed at the display device 25 and also are printed out at an output device (not shown) connected to the image data handling apparatus 2 or transmitted to a computer apparatus (not shown) that is capable of engaging in data exchange with the image data handling apparatus 2.

When a shutter release operation is performed at the electronic still camera 1, the electronic still camera 1 starts a photographing operation and image data output from the image capturing element 14 are recorded in the CF card 12 by the MPU 11. The MPU 11 also stores the image data in the transfer buffer memory 131 provided in the interface circuit 13. The image data stored in the transfer buffer memory 131 are transferred to the transfer buffer memory 231 provided at the interface circuit 23 of the image data handling apparatus 2 connected via the IEEE-1394 cable 3 and thus are taken into the image data handling apparatus 2. The image data taken into the image data handling apparatus 2 are read out from the transfer buffer memory 231 and are recorded in a specific recording area in the recording device 22 by the MPU 21.

The image data stored in the transfer buffer memory 131 of the interface circuit 13 are held in the transfer buffer memory 131 until they are transferred to the transfer buffer memory 231 at the interface circuit 23 of the image data handling apparatus 2. As a result, when the image data cannot be transferred from the transfer buffer memory 131 to the image data handling apparatus 2 immediately, the image data are transferred from the transfer buffer memory 131 to the image data handling apparatus 2 at a point in time at which an image data transfer becomes enabled. The image data cannot be transferred immediately in any of the following three situations, for instance. Namely, the electronic still camera 1 and the image data handling apparatus 2 are not connected with each other via the IEEE-1394 cable 3, an error has occurred in either the interface circuit 13 or the interface circuit 23 resulting in a transfer failure or a recording-ready state has not been achieved since the capacity at the recording device 22 is insufficient or no medium has been loaded.

When the transfer of the image data from the transfer buffer memory 131 to the image data handling apparatus 2 ends, the MPU 11 deletes the transferred image data in the transfer buffer memory 131. If the image data transfer has not been completed for a reason. e.g., the image data cannot be recorded in the recording device 22 of the image data handling apparatus 2, the MPU 11 does not delete the image data in the transfer buffer memory 131.

The image data handling apparatus 2 records the image data in the recording device 22 in the image data handling apparatus 2. The MPU 21 of the image data handling apparatus 2 monitors to ascertain whether or not any image data are stored in the transfer buffer memory 131 of the interface circuit 13 at the electronic still camera 1 via the interface circuit 23 and the IEEE-1394 cable 3. Based upon whether or not image data are stored in the transfer buffer memory 131, the MPU 21 makes a decision as to whether or not image data have been input via the interface circuit 23 and the IEEE-1394 cable 3. If there are image data stored in the transfer buffer memory 131, the MPU 21 receives the stored image data and stores them in the transfer buffer memory 231 in the interface circuit 23. The MPU 21 reads out the image data from the transfer buffer memory 231 and records them in a specific recording area of the recording device 22. Then, the MPU 21 deletes the recorded image data in the transfer buffer memory 231.

The MPU 21 of the image data handling apparatus 2 also monitors to ascertain whether or not the CF card 12A is loaded in the PC card slot 30. The MPU 21 detects the potential at a terminal (not shown) provided in the PC card slot 30 for card-load detection and detects that the CF card 12A is loaded in the PC card slot 30 depending upon whether or not the potential is equal to or higher than a predetermined potential level. Upon detecting that the CF card 12A is loaded, the MPU 21 detects an image data input from the CF card 12A and reads out the image data recorded in the CF card 12A. The image data read out from the CF card 12A are recorded in a specific recording area in the recording device 22.

Figure 21:
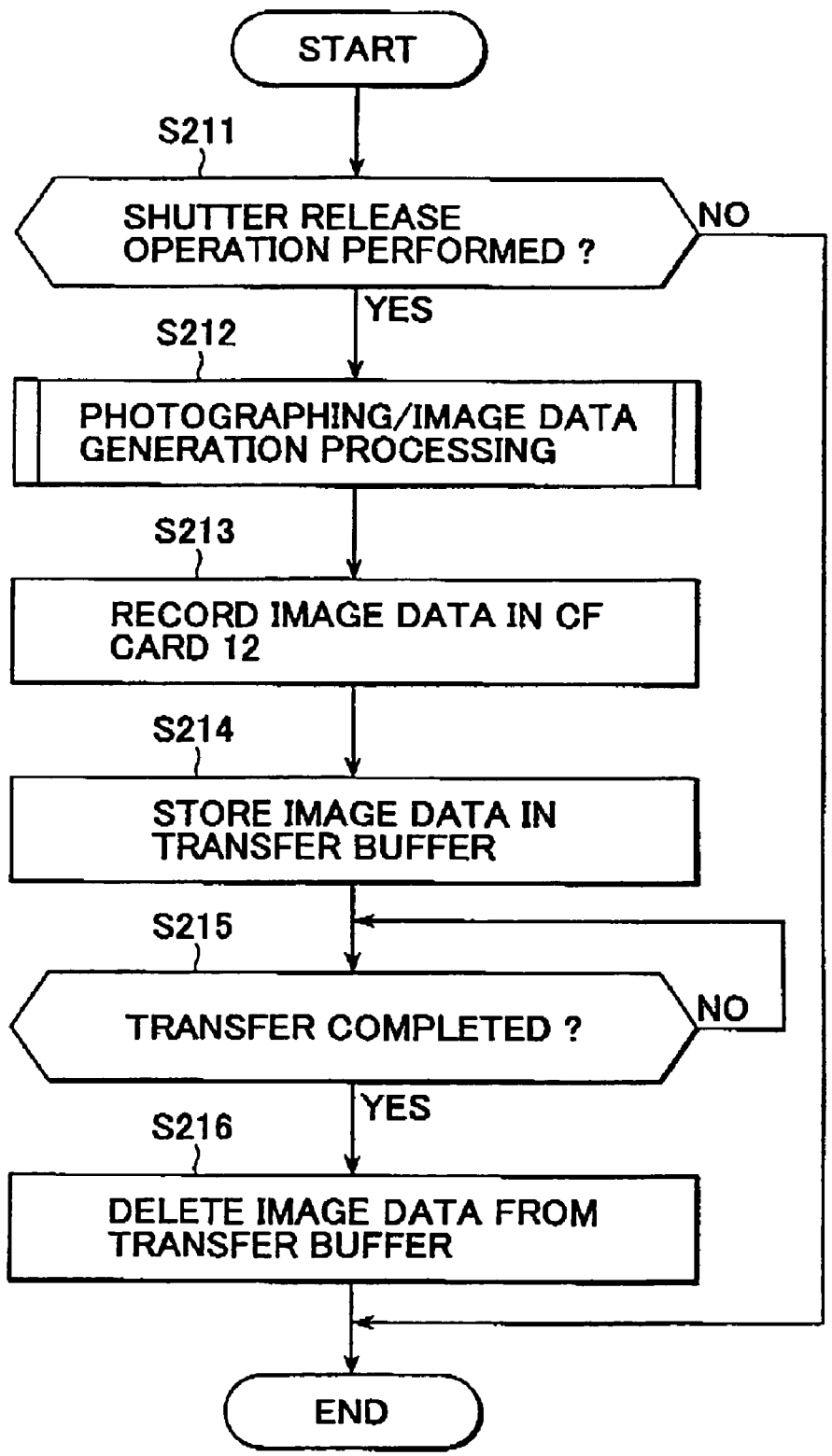
FIG. 21 is a flowchart of the processing implemented by the MPU of the electronic still camera.

FIG. 21 is a flowchart of the processing implemented by the MPU 11 of the electronic still camera 1 described above. In step S211 in FIG. 21, the MPU 11 makes a decision as to whether or not a shutter release operation has been performed. If an affirmative decision is made, i.e., if it is decided that a shutter release operation has been performed, the operation proceeds to step S212 in which photographing processing and image data generation processing are implemented. In step S213, the MPU 11 records the image data in a specific recording area of the CF card 12 before the operation proceeds to step S214.

In step S214, the MPU 11 stores the image data in the transfer buffer memory 131 and then the operation proceeds to step S215. In step S215, the MPU 11 makes a decision as to whether or not the transfer of the image data stored in the transfer buffer memory 131 has been completed. If an affirmative decision is made in step S215, the operation proceeds to step S216 in which the MPU 11 deletes the transferred image data stored in the transfer buffer memory 131 before the processing in FIG. 21 ends. If, on the other hand, a negative decision is made in step S215, the decision-making in step S215 is repeated.

Figure 22:
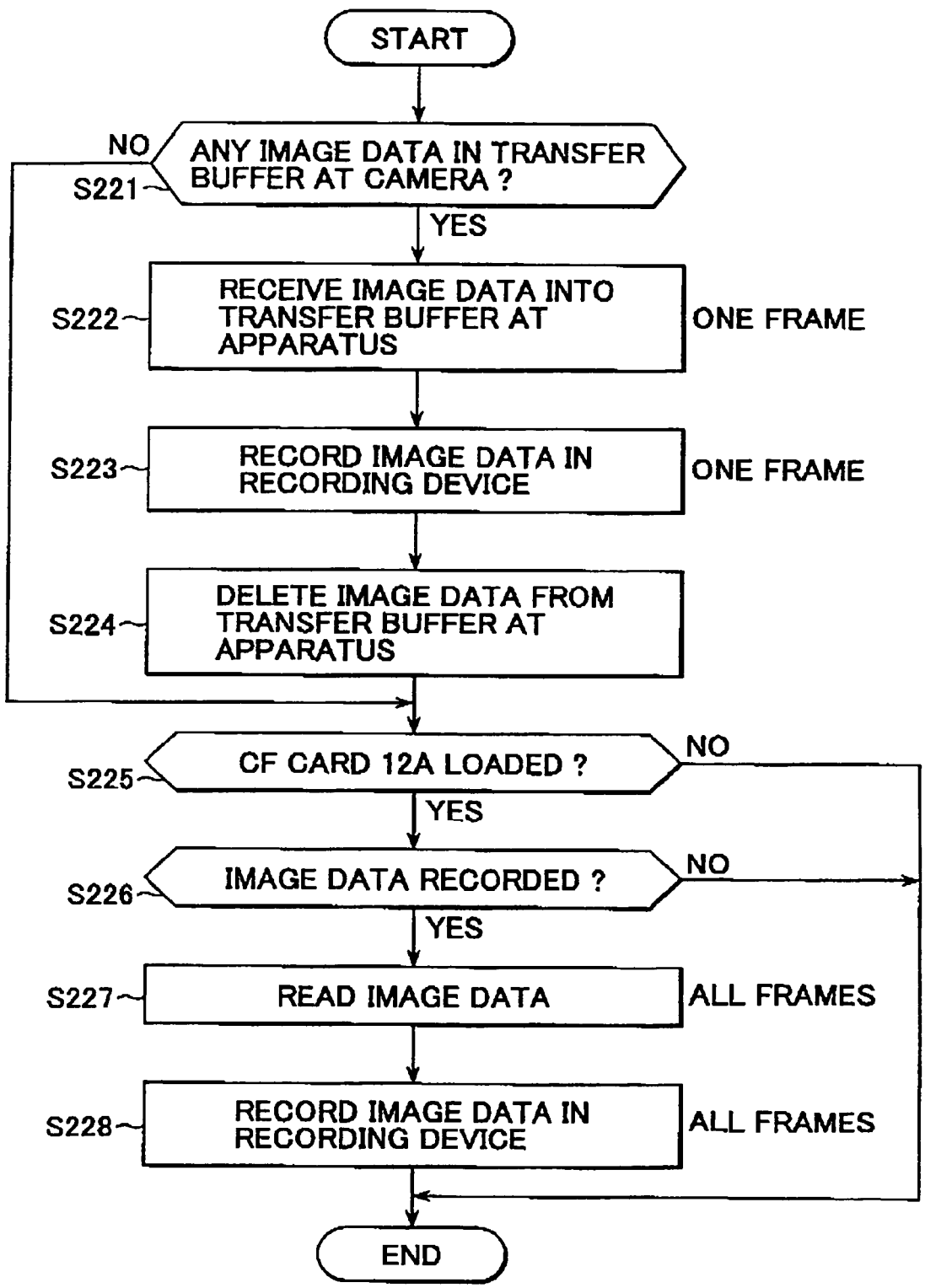
FIG. 22 is a flowchart of the processing implemented by the MPU of the personal computer in the image data handling apparatus.

In the image data handling apparatus 2, an application program having an IEEE-1394 image intake processing module and a PC card image intake processing module is executed. FIG. 22 is a flowchart of the processing implemented by the MPU 21 in the image data handling apparatus 2. The MPU 21 implements the processing shown in FIG. 22 repeatedly.

The IEEE-1394 image intake processing module is a program module that receives an image data file recorded in the CF card 12 at the electronic still camera 1 at the image data handling apparatus 2 via the IEEE-1394 cable 3 and the interface circuit 23 and records the received image data file in a specific area of the recording device 22. The processing implemented in steps S221-S224 in FIG. 22 corresponds to that achieved in the IEEE-1394 image intake processing module.

The PC card image intake processing module is a program module that engages the MPU 21 to read an image data file recorded in the CF card 12A loaded in the PC card slot 30 to record the image data file thus read in a specific area of the recording device 22. The processing implemented in steps S225-S228 in FIG. 22 corresponds to the processing achieved by the PC card image intake processing module.

In the image data handling apparatus 2, the image data file recording processing implemented in the PC card image intake processing module is given priority over the image data file recording processing implemented in the IEEE-1394 image intake processing module. Namely, while image data are being input via the interface circuit 23, a decision is made as to whether or not the CF card 12A is loaded every time an image data file corresponding to one frame is recorded in the recording device 22 by the IEEE-1394 image intake processing module. Once it is decided that the CF card 12A is loaded, the image data files for all the frames recorded in the CF card 12A are read out and recorded in the recording device 22. After the image data files for all the frames recorded in the CF card 12A are completely recorded, the IEEE-1394 image intake processing module records the image data file corresponding the next frame to be received via the IEEE-1394 cable 3 and the interface circuit 23. If no image data are being input via the interface circuit 23, a decision is made as to whether or not the CF card 12A is loaded and if it is decided that the CF card 12A is loaded, the image data files corresponding to all the frames recorded in the CF card 12A are read out and recorded in the recording device 22.

In the explanation of the embodiment, the operation described above is referred to as the priority operation. Namely, while image data are being input to the image data handling apparatus 2 via the interface circuit 23, image data corresponding to one frame that are being input via the interface circuit 23 are recorded in the recording device 22 if the presence of the CF card 12A is detected. Then, then the image data for the one frame have been recorded, the image data corresponding to all the frames recorded in the CF card 12A are read out and recorded in the recording device 22 before recording the image data of the next frame input via the interface circuit 23.

In step S221 in FIG. 22, the MPU 21 makes a decision as to whether or not image data are stored in the transfer buffer memory 131 of the electronic still camera 1. If an affirmative decision is made in step S221, the operation proceeds to step S222, whereas if a negative decision is made in step S221, the operation proceeds to step S225.

In step S222, the MPU 21 receives the image data for one frame from the transfer buffer memory 131 of the electronic still camera 1 and stores the image data in the transfer buffer memory 231 in the interface circuit 23 before the operation proceeds to step S223. In step S223, the MPU 21 reads out the image data for one frame from the transfer buffer memory 231 and records the image data in a specific recording area of the recording device 22. In step S224, the MPU 21 deletes the recorded image data in the transfer buffer memory 231 and then the operation proceeds to step S225.

In step S225, the MPU 21 makes a decision as to whether or not the CF card 12A is loaded. If an affirmative decision is made, i.e., if it is decided that the CF card 12A is loaded, the operation proceeds to step S226, whereas if a negative decision is made, the processing in FIG. 22 ends. In step S226, the MPU 21 makes a decision as to whether or not image data have been recorded in the CF card 12A. If an affirmative decision is made, i.e., if it is decided that image data have been recorded, the operation proceeds to step S227, whereas a negative decision is made if no image data have been recorded or the CF card 12A has not been initialized in a specific format and the processing in FIG. 22 ends.

In step S227, the MPU 21 reads the image data corresponding to all the frames recorded in the CF card 12A via the card read circuit 27 and the operation proceeds to step S228. In step S228, the MPU 21 records the image data for all the frames that have been read in a specific recording area of the recording device 22 before the processing in FIG. 22 ends.

In the sixth embodiment explained above, the image data handling apparatus 2 makes a decision as to whether or not the CF card 12A is loaded (step S225) each time the processing in which an image data file corresponding to one frame received from the electronic still camera 1 via the IEEE-1394 cable 3 and the interface circuit 23 is recorded in the recording device 22 is completed (step S224). If it is decided that the CF card 12A is loaded, the image data files corresponding to all the frames recorded in the CF card 12A are read and recorded in the recording device 22 (step S227). Thus, the image data in the CF card 12A from the other electronic still camera are given priority for recording over the image data from the electronic still camera 1. As a result, when a photographing operation cannot be performed at the other electronic still camera without the CF card 12A, the CF card 12A can be reloaded in the other electronic still camera promptly, thereby minimizing the length of time over which a photographing operation is disabled at the other electronic still camera.

In addition, when image data files are continuously input to the image data handling apparatus 2 via the interface circuit 23, e.g., when a shutter release operation is performed repeatedly at the electronic still camera 1, the image data handling apparatus 2 first records in the recording device 22 the image data corresponding to the frame received from the interface circuit 23 before it is decided that the CF card 12A is loaded, and then starts reading the image data files in the CF card 12A the presence of which has been detected. As a result, the processing for recording in the recording device 22 the image data file corresponding to the frame received before the decision is made that the CF card 12A is loaded is not halted in the middle, the received data are not wasted.

Two or more PC card slots 30 may be provided at the image data handling apparatus 2 described above. In such a case, a plurality of CF cards can be loaded in the image data handling apparatus 2. When a plurality of CF cards are loaded in the image data handling apparatus 2, the MPU 21 sequentially reads all the image data files recorded in the CF cards, starting with the CF card that is determined to be the first CF card loaded in a slot 30 and records the image data files thus read in the recording device 22. When the processing on the first CF card ends, the MPU 21 starts processing the next CF card.

In addition, two or more electronic still cameras may be connected to the image data handling apparatus 2. When a plurality of electronic still cameras are connected to the image data handling apparatus 2, the MPU 21 makes a decision as to whether or not there are any image data files in the transfer buffer memories in the individual electronic still cameras via the interface circuits connected to the electronic still cameras. Then, an image data file for one frame is received from the electronic still camera first determined by the MPU 21 to have stored therein an image data file via the corresponding interface circuit and the image data file thus received is recorded in the recording device 22. When the image data for one frame have been recorded, the MPU 21 again makes a decision as to whether or not there are image data files in the transfer buffer memories provided in the individual electronic still cameras.

While an explanation is given above on an example in which the electronic still camera 1 and the image data handling apparatus 2 are connected via the IEEE-1394 cable 3, the system may be constituted by connecting the electronic still camera 1 and the image data handling apparatus 2 of via a network cable other than the IEEE-1394 cable 3 or by connecting them with an interface device that engages in wireless transmission/reception. The interface used in such an application may be USB, Bluetooth, or IrDA. In any case, the present invention may be adopted when image data are transferred and recorded in conformance to a specific data communication protocol between the electronic apparatuses connected either through a wired connection or a wireless connection.

In addition, instead of the electronic still camera 1, an electronic apparatus that generates image data such as a scanner apparatus or a personal computer internally provided with a camera may be utilized. Furthermore, the functions achieved in the image data handling apparatus 2 may be incorporated in a printer, a TV monitor, telephone or the like.

While an explanation is given above on an example in which the CF card 12 A constitutes the recording medium loaded in the image data handling apparatus 2, the recording medium may be any of various types of removable disks such as an MD, a CD and a DVD as well as a memory card which may be a smart medium.

Figure 23:
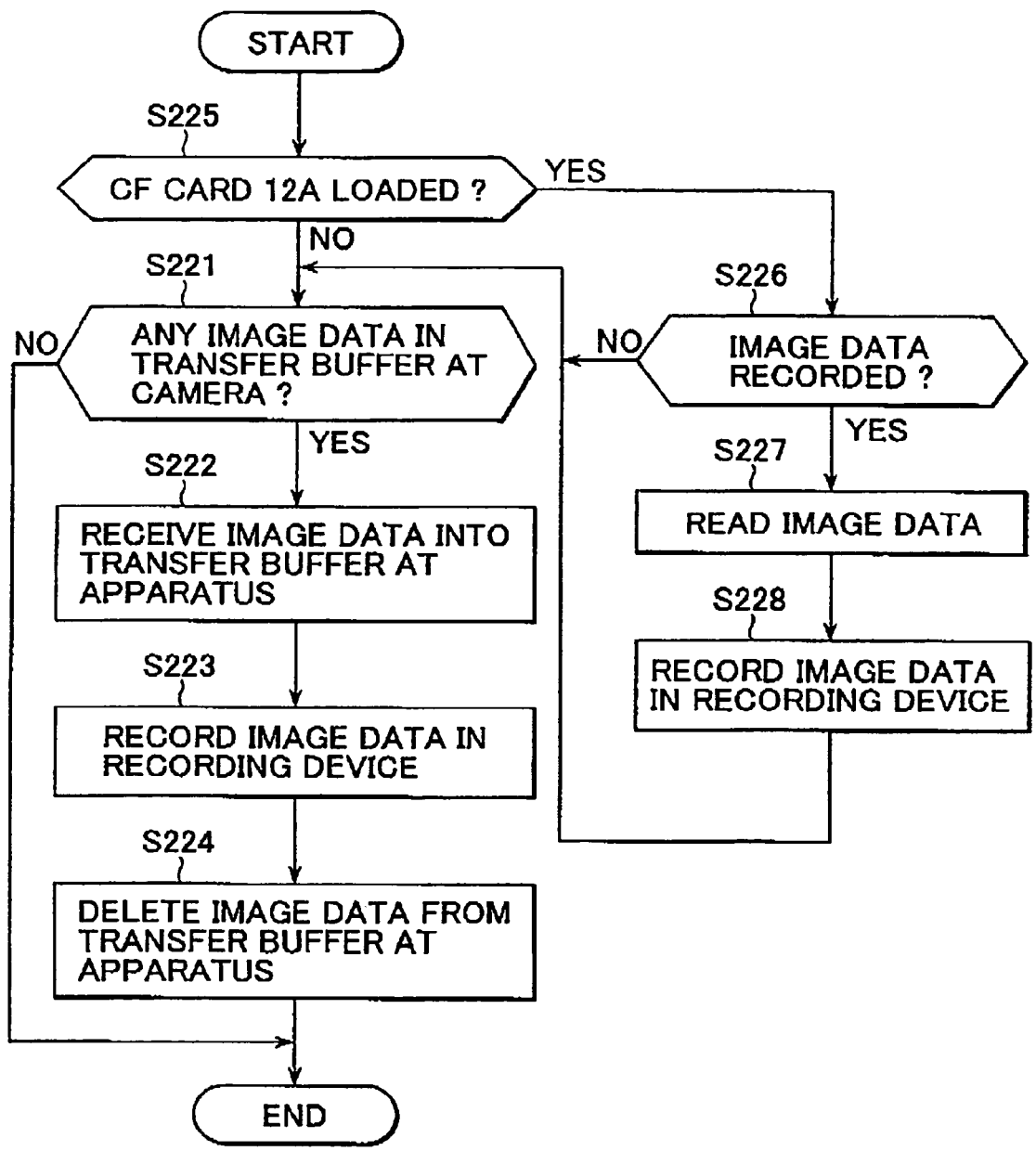
FIG. 23 is a flowchart of the processing implemented by the MPU by adopting another method.

The image data files in the CF card 12A may be given priority for recording at the recording device 22 of the image data handling apparatus 2 through the method shown in FIG. 23 instead. FIG. 23 is a flowchart of processing implemented by the MPU 21 of the image data handling apparatus 2. In the steps assigned with the same step numbers as those in FIG. 22, processing identical to that in FIG. 22 is implemented. In FIG. 23, the MPU 21 makes a decision in step S225 as to whether or not the CF card 12A is loaded before implementing the processing in step S221, in which a decision is made as to whether or not any image data are stored in the transfer buffer memory 131 of the electronic still camera 1. Then, if it is decided that the CF card 12A is loaded (if an affirmative decision is made in step S225), the image data files for all the frames recorded in the CF card 12A are read (step S227) and the image data files thus read are recorded in the recording device 22 (step S228). Next, in step S221, the MPU 21 makes a decision as to whether or not there are image data stored in the transfer buffer memory 131 of the electronic still camera 1. By adopting this method, too, the length of time over which a photographing operation is disabled at the other electronic still camera that needs the CF card 12A to perform a photographing operation is reduced.

Figure 24A:
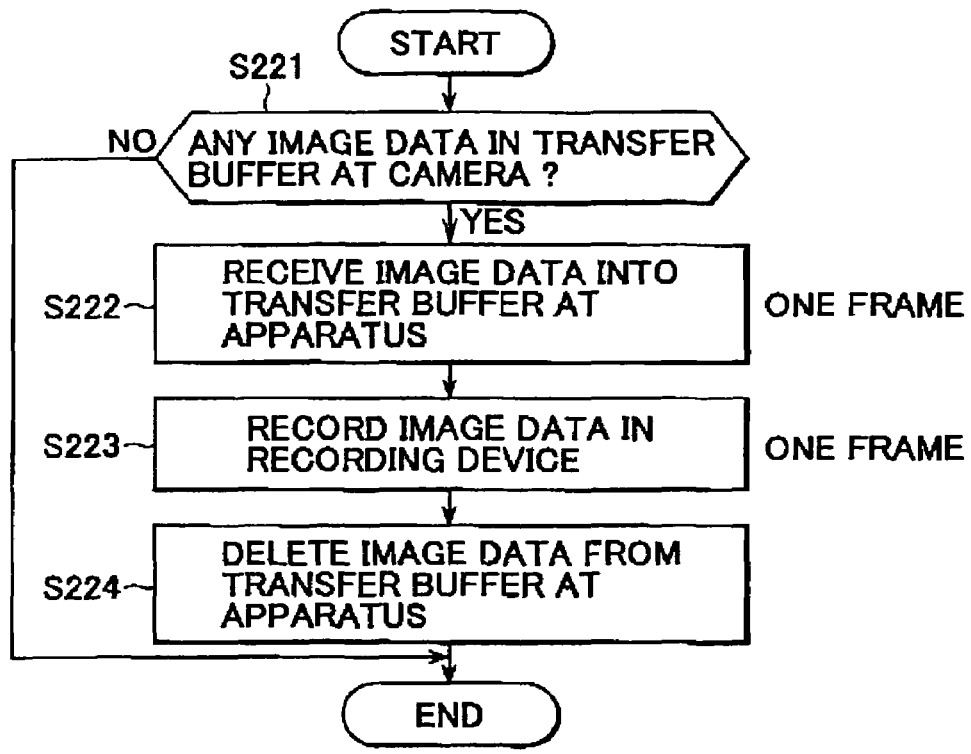
FIG. 24A is a flowchart of the main processing implemented by the MPU by adopting another method.
Figure 24B:
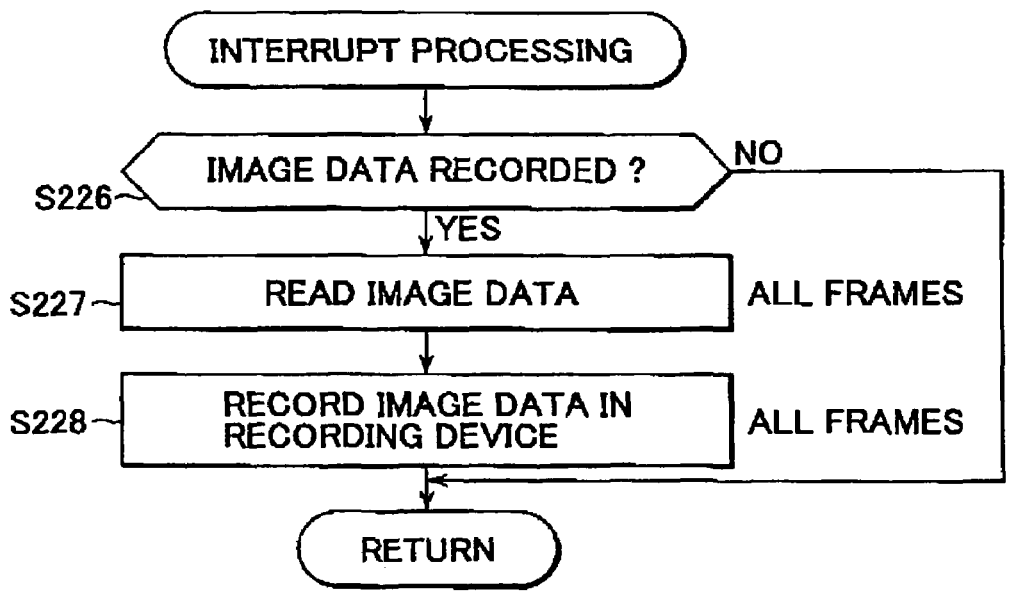
FIG. 24B is a flowchart of the interrupt processing implemented by the MPU by adopting the other method.

Alternatively, the MPU 21 may make a decision as to whether or not the CF card 12A is loaded through interrupt processing. FIG. 24 presents a flowchart of processing implemented by the MPU 21 of the image data handling apparatus 2. In the steps assigned with the same step numbers as those in FIGS. 22 and 23, processing identical to that in FIGS. 22 and 23 is implemented. In FIG. 24A, the MPU 21 implements processing for recording in the recording device 22 an image data file corresponding to one file received from the electronic still camera 1 via the interface circuit 23. If the CF card 12A is loaded to interrupt the MPU 21 while the processing in FIG. 24A is in progress, the MPU 21 starts the interrupt processing in FIG. 24B.

When the MPU 21 starts the interrupt processing in FIG. 24B, the processing implemented in steps S221-S224 in FIG. 24A to record in the recording device 22 the image data file received at the transfer buffer memory 231 is interrupted (halted) in the middle or aborted (canceled), the image data files for all the frames recorded in the CF card 12A are read (step S227) and the image data files thus read are recorded in the recording device 22 (step S228). After the image data files read from the CF card 12A are recorded in the recording device 22, the operation returns to implement the processing in steps S221-S224 in FIG. 24A having been interrupted (halted) in the middle or aborted (canceled) and the image data file received via the interface circuit 23 is recorded. At this time, if the processing for recording an image data file for one frame in the recording device 22 was interrupted (halted), the processing is resumed at the point at which it was interrupted (halted), whereas if the processing for recording an image data file for one frame in the recording device 22 was aborted (canceled), the processing is resumed from the beginning.

What is claimed is:

1. A method for transmitting image data from an electronic camera to a computer apparatus, comprising:

preparing a plurality of sets of attribute information of a set of image data when generating the set of image data, by the electronic camera;

recording in a recording device of the computer apparatus an attribute data file in which a plurality of sets of attribute information corresponding to a set of image data already recorded in the recording device are recorded, by the computer apparatus;

receiving the plurality of sets of attribute information of the set of image data, comparing the plurality of sets of attribute information thus received with the plurality of sets of attribute information recorded in the attribute data file in the recording device of the computer apparatus, and issuing a request for the image data to the electronic camera only when the plurality of sets of attribute information of the image data do not completely match the plurality of sets of attribute information recorded in said attribute data file, by the computer apparatus;

preparing the set of image data upon receiving the request for the set of image data, by the electronic camera;

receiving the set of image data to newly record in the recording device and updating said attribute data file by recording the plurality of sets of attribute information of the set of image data after the set of image data have been newly recorded, by the computer apparatus; and displaying an image at a display device based upon the set of image data newly recorded in the recording device in response to newly recording the set of image data in the recording device, by the computer apparatus.

2. A method for transmitting data from a first electronic apparatus having data to a second electronic apparatus that records data in a recording medium, comprising:

recording in a recording medium of the second electronic apparatus an attribute data file in which a plurality of sets of attribute information corresponding to a set of data already recorded in the recording medium are recorded, by the second electronic apparatus;

receiving a plurality of sets of attribute information of a set of data generated from the first electronic apparatus, and comparing the plurality of sets of attribute information with the plurality of sets of attribute information recorded in the attribute data file in the recording medium, by the second electronic apparatus;

receiving the set of data from said first electronic apparatus and newly recording the set of data in the recording medium only when the plurality of sets of attribute information of the set of data do not completely match the plurality of sets of attribute information recorded in said attribute data file, by the second electronic apparatus;

updating said attribute data file by recording the plurality of sets of attribute information of the set of data after the set of data have been newly recorded, by the second electronic apparatus; and displaying an image at a display device based upon the set of data newly recorded in the recording medium in response to newly recording the set of data in the recording medium, by the second electronic apparatus.

3. An image data transmitting system, comprising:

an electronic camera; and an image data receiving device, wherein:

the electronic camera comprises an image capturing unit that captures an image of a subject to generate a set of image data, and a camera control unit that prepares a plurality of sets of attribute information of the set of image data and records the set of image data and the plurality of sets of attribute information of the set of image data into a recording medium; and the image data receiving device comprises a receiving unit that connects with the electronic camera and receives the set of image data and the plurality of sets of attribute information of the set of image data recorded in the recording medium from the electronic camera, a recording unit that stores the set of image data and the plurality of sets of attribute information of the set of image data received from the electronic camera, a display unit, and a control unit that controls the receiving unit, the recording unit and the display unit; and the control unit of the image data receiving device controls the receiving unit to receive the plurality of sets of attribute information of the set of image data before receiving the set of image data, compares the plurality of sets of attribute information thus received with a plurality of sets of attribute information already recorded in the recording unit, controls the receiving unit to receive the set of image data only when the plurality of sets of attribute information of the set of image data does not completely match the plurality of sets of attribute information already recorded in the recording unit, newly records the received image data and the received attribute information of the set of image data into the recording unit, and displays an image on the display unit based upon the set of image data newly recorded into the recording unit in response to newly recording the set of image data in the recording unit.

4. An image data receiving device that receives an image data from an external device, comprising:

a receiving unit that connects with the external device and receives a set of image data and a plurality of sets of attribute information of the set of image data recorded in the external device;

a recording unit that stores the set of image data and the plurality of sets of attribute information of the set of image data received from the external device;

a display unit; and a control unit that controls the receiving unit, the recording unit and the display unit, wherein the control unit controls the recording unit to record an attribute data file in which a plurality of sets of attribute information corresponding to a set of image data already recorded in the recording unit are recorded; and the control unit controls the receiving unit to receive the plurality of sets of attribute information of the set of image data before receiving the set of image data from the external device, compares the plurality of sets of attribute information thus received with the plurality of sets of attribute information already recorded in the attribute data file in the recording unit, controls the receiving unit to receive the set of image data only when the plurality of sets of attribute information of the set of image data does not completely match the plurality of sets of attribute information already recorded in the recording unit, newly records the received set of image data and the received plurality of sets of attribute information of the set of image data into the recording unit, and displays an image on the display unit based upon the set of image data newly recorded into the recording unit in response to newly recording the set of image data into the recording unit.

5. A method for transmitting image data from an electronic camera to a computer apparatus according to claim 1, further comprising:

detecting a newly received and recorded set of image data, by the computer apparatus, wherein the computer apparatus displays the image on the display device based upon the detected set of image data.

6. A method for transmitting image data from an electronic camera to a computer apparatus according to claim 5, wherein the newly received and recorded set of image data is detected in the computer apparatus by:

creating an identification data file containing information related to the newly received and recorded set of image data;

recording the identification data file in a specific recording area;

reading the identification data file from the specific recording area;

identifying the newly received and recorded set of image data by using the identification data file read from the specific recording area; and deleting the identification data file recorded in the specific recording area after identifying.

* * * * *